(12) United States Patent
Corey et al.

(10) Patent No.: US 6,634,409 B2
(45) Date of Patent: Oct. 21, 2003

(54) FABRIC VENETIAN BLIND AND METHOD OF FABRICATION

(75) Inventors: John A. Corey, Melrose, NY (US); Thomas J. Marusak, Loudonville, NY (US)

(73) Assignee: Comfortex Corporation, Maplewood, NY (US)

( * ) Notice: Subject to any disclaimer, the term of this patent is extended or adjusted under 35 U.S.C. 154(b) by 84 days.

(21) Appl. No.: 09/892,309

(22) Filed: Jun. 26, 2001

(65) Prior Publication Data

US 2002/0014296 A1 Feb. 7, 2002

Related U.S. Application Data

(60) Division of application No. 09/349,907, filed on Jul. 8, 1999, now Pat. No. 6,302,982, which is a continuation-in-part of application No. 09/288,389, filed on Apr. 8, 1999, now abandoned, which is a continuation-in-part of application No. 08/947,608, filed on Oct. 9, 1997, now Pat. No. 6,024,819.

(51) Int. Cl.[7] .............................................. E06B 9/262
(52) U.S. Cl. .................. 160/236; 160/84.05; 160/84.04
(58) Field of Search .............................. 160/236, 84.04, 160/84.05; 156/193, 195

(56) References Cited

U.S. PATENT DOCUMENTS

| | | | |
|---|---|---|---|
| 3,013,921 A | 12/1961 | Jacobson |
| 3,031,357 A | 4/1962 | Balkin et al. |
| 3,032,099 A | 5/1962 | Croxen |
| 3,157,545 A | 11/1964 | Waldron et al. |
| 3,384,519 A | 5/1968 | Froget |
| 3,822,166 A | 7/1974 | Anderson |
| 3,963,549 A | 6/1976 | Rasmussen |
| 4,019,554 A | 4/1977 | Rasmussen |
| 4,288,485 A | 9/1981 | Suominen |
| RE31,129 E | 1/1983 | Rasmussen |
| 4,450,027 A | 5/1984 | Colson |
| 4,625,786 A | 12/1986 | Carter et al. |
| 4,631,217 A | 12/1986 | Anderson |
| 4,676,855 A | 6/1987 | Anderson |
| 4,685,986 A | 8/1987 | Anderson |
| 4,732,630 A | 3/1988 | Schnebly |
| 4,885,190 A | 12/1989 | Schnebly |
| 5,043,038 A | 8/1991 | Colson |
| 5,043,039 A | 8/1991 | Swiszcz |
| 5,232,529 A | 8/1993 | Miyake |
| 5,287,908 A | 2/1994 | Hoffmann et al. |
| 5,296,061 A | 3/1994 | Ando et al. |
| 5,313,999 A | 5/1994 | Colson et al. |
| 5,320,154 A | 6/1994 | Colson et al. |

(List continued on next page.)

FOREIGN PATENT DOCUMENTS

| | | |
|---|---|---|
| DE | 2840023 | 3/1980 |
| DE | 2936811 | 4/1981 |
| FR | 1521488 | 3/1968 |
| WO | WO 99/19592 A1 * | 4/1999 |

*Primary Examiner*—Jeff H. Aftergut
(74) *Attorney, Agent, or Firm*—Rader, Fishman & Grauer PLLC

(57) ABSTRACT

A method of making a fabric Venetian blind comprises helical winding of a narrow, elongated strip, which, when properly overlapped and bonded along longitudinal glue lines, will form the vanes and front and rear facings of the blind. The strips may be formed of a single, uniform material, or of adjacent, longitudinally extending portions of relatively opaque and relatively translucent fabric. An alternative embodiment uses the same winding technique to similarly form a structure of only translucent fabric, but with pockets for subsequent insertion of opaque vanes. Several alternative strip configurations and assembly arrangements are disclosed. The disclosed method and structure may also be used to form products for other applications.

1 Claim, 14 Drawing Sheets

U.S. PATENT DOCUMENTS

| | | |
|---|---|---|
| 5,339,882 A | 8/1994 | Judkins |
| 5,394,922 A | 3/1995 | Colson et al. |
| 5,455,098 A | 10/1995 | Cheng |
| 5,456,304 A | 10/1995 | Colson et al. |
| 5,460,672 A | 10/1995 | Mallonee |
| 5,490,553 A | 2/1996 | Colson et al. |
| 5,603,369 A | 2/1997 | Colson et al. |
| 5,638,880 A | 6/1997 | Colson et al. |
| 5,664,613 A | 9/1997 | Jelic |
| 5,888,639 A | 3/1999 | Green et al. |
| 6,024,819 A | 2/2000 | Corey |

\* cited by examiner

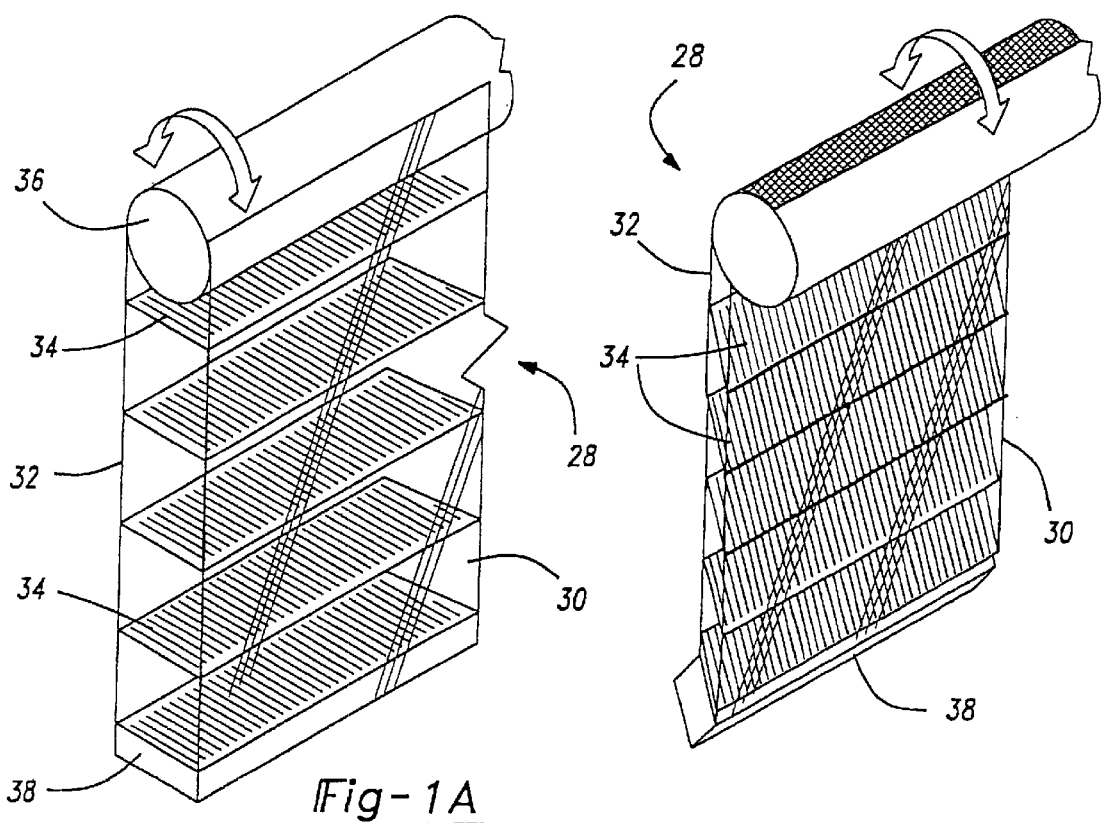
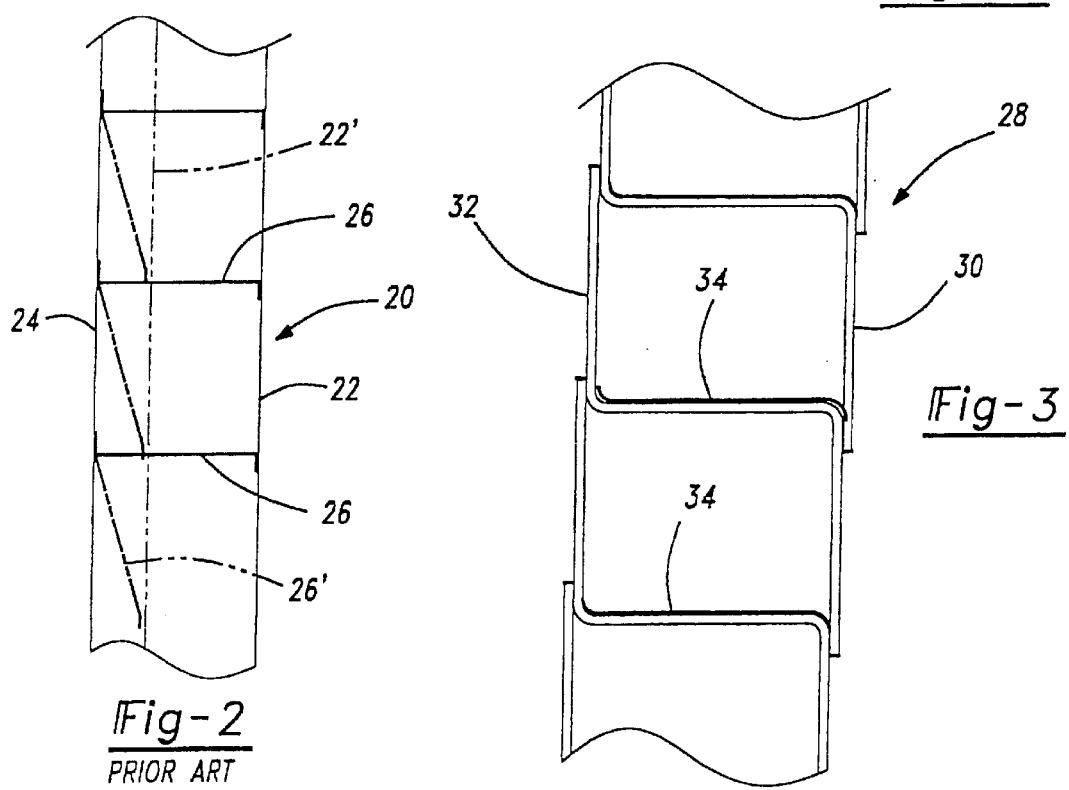
Fig-1A
Fig-1B
Fig-2
PRIOR ART
Fig-3

FABRIC VENETIAN BLIND AND METHOD OF FABRICATION

This is a divisional application of application Ser. No. 09/349,907 filed on Jul. 8, 1999, now U.S. Pat. No. 6,302, 082, which is a continuation in part of abandoned application Ser. No. 09/288,389 filed on Apr. 8, 1999, which is a continuation in part of application Ser. No. 08/947,608, filed Oct. 9, 1997 and which issued on Feb. 15, 2000 as Pat. No. 6,024,819.

FIELD OF INVENTION

This invention relates to window coverings, and more particularly to the field of Venetian blinds having front and rear panels of sheer or translucent fabric between which are arrayed a series of relatively opaque fabric slats or vanes which can be tilted for light control by means of limited rotation of a wind-up roll to which the front and rear panels are connected. The invention includes an improved product, fabricating technique and apparatus for fabricating such blinds, which technique can also be applied to forming multi-layered composite sheets used in other types of products and for other purposes.

BACKGROUND OF THE INVENTION

The most familiar type of Venetian blind window covering comprises a series of rigid slats or vanes suspended and controlled by a ladder cord system. The slats are typically wood, plastic or metal, and rest on the ladder cord rungs. The rungs are secured to front and rear vertical cords whose upper ends are secured to circumferentially spaced locations on a wheel. Limited rotation of the wheel, by means of a control wand or cords, causes relative motion between the front and rear cords, which in turn tilts the rungs and vanes. The entire array can be raised and lowered by additional cords which act to lift a bottom rail.

A modified type of Venetian blind is disclosed in U.S. Pat. No. 3,384,519 to Froget. There, the ladder cord system is replaced by front and rear cloth panels to which the vanes are heat welded. Preferably, the cloth panels and vanes are all made of thermoplastic yarns, to facilitate bonding by heat welding. Partial rotation of an upper drum, to which the panels are connected, shifts the panels relative to each other, thereby causing the vanes to tilt for light control. Another similar product is disclosed in French Patent No. 1,521,488 to Demerson. Demerson prefers films to woven fabrics, and discloses adhesive bonding of the vanes to the facing panels.

Several more recent patents are directed to modifications of Froget's basic idea, wherein the vanes are made of flexible fabric, adhesively bonded to the front and back panels. Additionally, the entire array can be retracted from the window opening by winding it onto an upper wind-up roller by means of cords which lift a bottom rail. Representative of these patents are U.S. Pat. Nos. 5,287,908, 5,313, 999, 5,320,154, 5,394,922 and 5,456,304, all assigned to Hunter Douglas, Inc., and a patent to Ren Judkins U.S. Pat. No. 5,339,882.

U.S. Pat. No. 5,664,613 (and subsequently assigned to a company owned by the assignee of the present application) describes another form of construction for a fabric Venetian blind. A continuous panel of relatively translucent material forms one facing of the blind. To that panel is bonded a series of parallel fabric strips at uniform intervals. Each strip comprises two adjacent portions of dissimilar material, one being relatively translucent and the other relatively opaque. The free edge of the opaque portion is bonded to the facing panel, while the free edge of the translucent portion is bonded to the adjacent strip at the junction line of that strip's two portions. The assembled translucent portions of the constituent strips become the second facing panel of the completed blind. That is, the second facing panel, rather than being a single continuous panel of fabric, is a composite of several parallel strips, each having a height dimension approximately equal to the width (or depth) of the vanes.

U.S. Pat. No. 5,888,639, assigned to Newell Operating Co., discloses in FIGS. 15–19 a fabric Venetian blind having a structure very similar to that disclosed in FIGS. 3–6 of my parent application Ser. No. 08/947,608, filed Oct. 9, 1997 (which Figures are also found in the present application). As in my parent application, the product is a laminated assembly of previously formed three-element strips. However, the relationship of the individual components of each three-element strip, and the method of preparing each such strip for subsequent assembly to adjacent strips, is substantially different. Furthermore, the method of assembly of the three-element strips to each other is substantially different, in that the strips are cut to a predetermined length, prior to their lamination to each other, which length corresponds to the desired width of the fabric Venetian blind. The method of assembly disclosed in my parent application and herein, wherein the three-element strip is helically wound upon itself in partially overlapping successive layers, represents a substantial improvement in the speed and economy of manufacture.

U.S. Pat. Nos. 5,490,553 and 5,603,369, assigned to Hunter Douglas, disclose in FIGS. 16–19 a vertical blind wherein each vertical blind vane is formed of the same strip of material as an adjoining portion of a facing panel on one side of the vanes. The single facing is a composite of narrow vertical strips. The vane portion of this strip is doubled back on itself. Another patent assigned to Hunter Douglas, U.S. Pat. No. 5,638,880, discloses in FIG. 26 a vertical blind wherein the facing on one side of the vanes comprises a series of vertical strips of material, each joined along one vertical edge to an adjacent strip, and at the other vertical edge to both the adjacent facing strip on that side and a discrete piece of substantially rigid, planar material forming the vane. The patent further discloses that both a front and a rear facing may be fabricated of such strips, and the strips and vanes can be oriented in either the vertical or horizontal directions.

U.S. Pat. No. 4,631,217, also assigned to Hunter Douglas, discloses in FIG. 2 a honeycomb or cellular type of window covering wherein a series of pleated, generally Z-shaped strips, each formed of a single piece of fabric, are bonded together in a manner whereby each strip forms the front portion of one cell, the rear portion of an adjacent cell, and a dividing wall between the two cells. The dividing walls, however, are incapable of functioning as the vanes of a Venetian blind type of product, because they remain substantially perpendicular to the front and rear faces of the window covering throughout the full range of expansion and collapse of the cells.

Known processes for manufacturing these prior art fabric Venetian blinds are complex, slow and costly, and have contributed to a high price for these otherwise attractive products.

Accordingly, it is a principal object of the present invention to create additional alternative three-element or multi-element strip configurations and bonding procedures which also lend themselves to the use of the more economical helical winding technique disclosed in my above-mentioned parent application.

SUMMARY OF THE INVENTION

The presently contemplated application for the disclosed invention is the formation of fabric Venetian blinds, using a technique of helically winding an elongated strip of fabric. In one embodiment of the Venetian blind, a three-portion strip is initially formed from three side-by-side, longitudinal, bands or portions of approximately equal width and length. Each edge of the central portion is joined by ultrasonic welding to an edge of the adjacent outer portion. The outer portions are formed of sheer or relatively transparent material, and the central portion is relatively opaque.

As a result of the helical winding process, the central portion becomes the blind vane, while the two outer portions ultimately become segments of the front and rear composite facings of the blind. Successive windings are staggered and partially overlapped so that two of the three portions of the underlying winding are covered by the overlying winding. Two longitudinally extending glue lines are applied along the underside of the infeeding overlapping strip, these being positioned to bond together adjacent windings. A tube-like wound structure is formed which, when cut open along a line perpendicular to the helix angle, will result in a fabric Venetian blind. The disclosed method of fabrication thus differs significantly from the prior art. Indeed, this product and its benefits could not so economically be achieved by known manufacturing processes.

The strips, once assembled by the winding operation, produce both the flexible vanes and the front and rear face panels in a single continuous process. The resulting composite face panels comprise narrow, horizontal strips which have been joined successively to one another in the winding operation. The resulting flexible vanes swing between light-admitting and light-blocking positions upon relative movement between the two composite face panels.

Alternative constructions may include an additional layer of fabric in the vane portion, to create a pocket into which an opaque insert can subsequently be inserted, and the formation of products having multiple rows of vanes or central ligaments.

Another alternative construction relates to a modified three-element strip configuration wherein the entirety of one sheer strip more fully overlaps the relatively opaque vane strip, with one edge substantially aligned with a first edge of the vane and ultrasonically welded thereto, while the other sheer strip is slightly lapped under and ultrasonically welded to the second edge of the vane. The vane is slightly wider than each of the sheer strips, permitting the vane to be simultaneously welded to each of the sheers without interference by overlapping the other sheer at the desired weld zone.

The novel winding technique disclosed herein may also be used to fabricate products from other types of materials or intended for other fields of use. For example, multi-layered materials made from thermally non-conductive or reflective material may be made for insulation applications; polarized or tinted films may be used to create desired optical effects; and materials of selected porosity may be used to form air filtration products.

Also disclosed is the use of a resiliently deformable circumferential surface on a nip roll which functions to steer the sheet-like material which is driven by the roll set when differential pressure is applied to the two ends of the deformable roll.

BRIEF DESCRIPTION OF THE DRAWINGS

FIG. 1A is a simplified perspective view of the fabric Venetian blind of the present invention, shown with the vanes positioned in their maximum light-admitting setting.

FIG. 1B is a view similar to FIG. 1A, showing the vanes positioned in a partially closed setting.

FIG. 2 is a side view, in simplified form, of a representative prior art fabric Venetian blind, wherein the vanes are joined to single, continuous-sheet type front and rear sheer panels. The blind is shown in the fully-open position of the vanes, while a partially closed position is shown in phantom lines.

FIG. 3 is an enlarged fragmentary side view of the blind of FIG. 1A.

DETAILED DESCRIPTION

Figure 5:
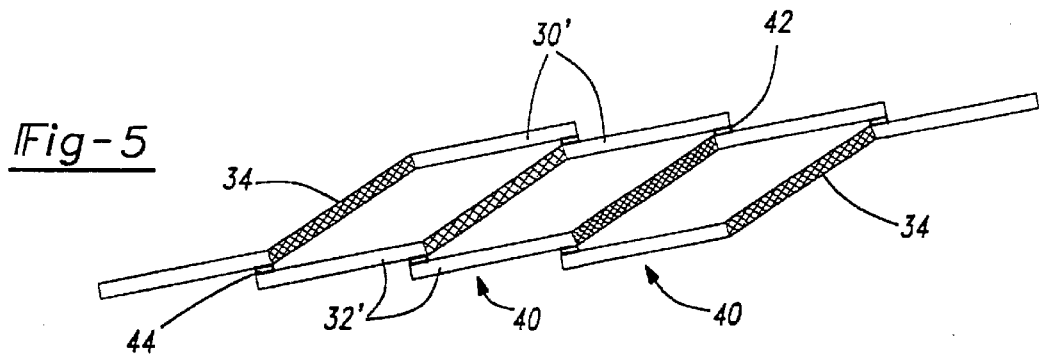
FIG. 5 is an enlarged, simplified view of the blind of FIG. 3, with the vertical scale exaggerated to reveal the relationship of adjacent three-portion strips.

FIG. 2 of the drawings shows a fabric Venetian blind 20 which, in its general construction, is typical of the prior art. The solid lines indicate the fully-open position of the vanes. The blind comprises a front facing 22, rear facing 24 and vanes or slats 26. The front and rear facings are each typically formed of a continuous panel of sheer material, chosen for its combination of soft, aesthetic appeal, its ability to permit a substantial amount of light to be transmitted when the vanes are in their open position, and, depending upon the selected weave, its ability to permit viewing of scenes through the material. The vanes are bonded along their respective longitudinal edges to the front and rear facings. Bonding can be by adhesive or thermal welding. When the wind-up roller from which the blind is suspended is rotated slightly, the front and rear facings shift in a vertical direction relative to each other, causing the angle of the vanes to change. A position near the fully-closed setting of the vanes is shown in phantom in FIG. 2, with the elements labeled with primed numerals.

FIGS. 1A and 1B show, in simplified form, the basic elements of a complete fabric Venetian blind assembly 28 in full-open and near-closed conditions, respectively. The blind comprises front and rear sheer or relatively translucent facings 30, 32, respectively, a plurality of relatively opaque vanes 34, a wind-up roller 36 and a bottom rail 38. Not shown are the cords or other means for rotating roller 36 to adjust the vane angle and to roll the shade around the roller to fully expose all or a portion of the window opening.

Comparing FIGS. 1A and 1B it can be seen how the points of attachment of the front and rear facings to opposite sides of the circumference of the roller result in relative vertical movement of the facings, and therefore adjustment of the vane angle, when the roller is rotated slightly.

Figure 4:
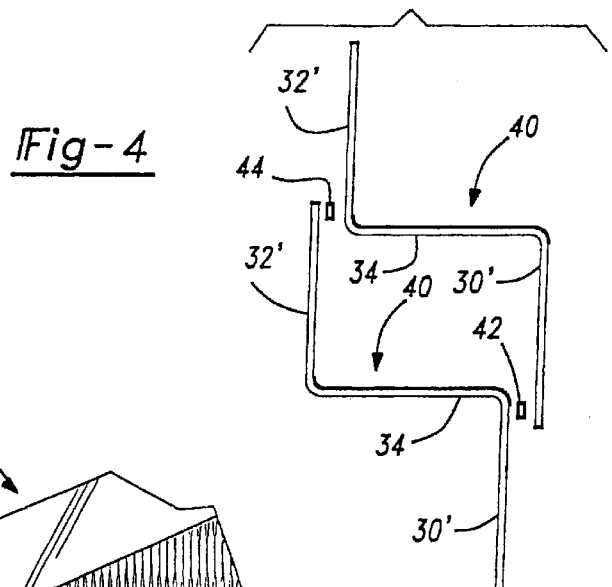
FIG. 4 is an exploded schematic view of the blind of FIG. 3, showing the relationship of adjacent three-portion strips.
Figure 6:
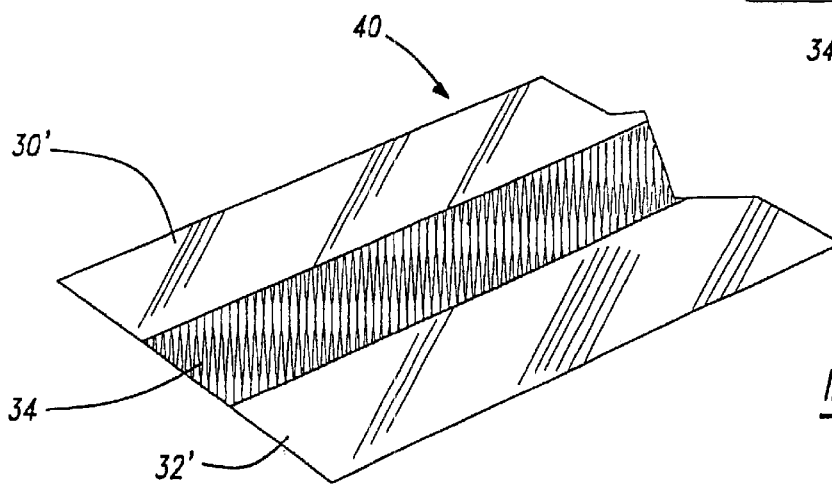
FIG. 6 is a perspective view of a fragment of a three-portion strip such as used in the embodiments of FIGS. 4 and 5.

FIG. 3 and the following figures illustrate various novel aspects of the present invention. A first embodiment is best shown in FIGS. 4–6. Fabrication begins with the creation of an elongated strip 40 (see FIG. 6) comprising at least two dissimilar fabric materials. The outer portions 30',32' are formed of relatively translucent or sheer material, while central portion 34 is formed of a relatively opaque material. Outer portions 30',32' may be formed of the same or different fabrics. The central portion can be opacified by use of a more densely woven fabric, or by coating or laminating (see discussion of FIGS. 7 and 8 below) or by the use of opaque inserts (see discussion of FIG. 18 below). The adjoining edges of these portions may be connected by gluing, ultrasonic welding, thermal bonding or stitching. Ultrasonic welding is the preferred method, because it is speedy and permits precision location of adjoining edges.

To accomplish such welds, the strip portions are made to overlap one another in the region to be welded, which overlap is then melted together by a commercially available ultrasonic seam welding device such as a Seam Master LM 720 or LM 920 manufactured by Sonobond Corporation. By way of example, the overlap may be about 0.10–0.20 inches, with the welding performed by a stitch-wheel having about one and one-half times the pitch of the main knit, in order to assure fiber capture. A continuous (rather than stitch knit) will also work if the vane is non-woven or film material. This process also beneficially compresses the welded zone and destroys the fabric interstices, so that the joint will not be porous to subsequently applied glue lines. Thus, unsightly bleed-through of the glue lines is avoided. The width of strip 40 is approximately three times the desired vane width (i.e., blind thickness in the fully open setting of the vanes). It should be noted that the illustrations of FIGS. 4–6, for simplicity, show the three-element strips as if they are each an entirely coplanar composite structure, without overlapping junctions at the adjoining edges of their individual component strips. In practice, it is preferred that the vane overlaps one sheer and underlaps the other sheer, with the strips being overlapped with adjacent three-element strips so that the sheer of one strip overlaps and is directly glued to the sheer of the preceding and succeeding strips.

Unlike known processes of the prior art, the fabric Venetian blind of the present invention is generated by helically winding the strip upon itself, in partially overlapping fashion, with each winding being bonded to the preceding winding along uniformly located longitudinal bonding lines. The result is that each winding of strip material 40 constitutes one vane and an adjacent fragment of each of the front and rear facings of the completed fabric Venetian blind.

The relationship of adjacent windings of strips 40 of this first embodiment is best seen in FIGS. 4 and 5. Each strip winding 40 overlaps approximately two-thirds of the preceding strip winding. Specifically, the leading edge (i.e., the right edge as viewed in FIG. 6) of a winding is placed at or near the sheer/opaque junction of the preceding winding. A previously applied front glue line 42 is located on the underside of the upper strip at that contact line, while a previously applied rear glue line 44 is located at the underside of the upper strip at or near the junction between the rear sheer portion 32' and the opacified vane portion 34. That rear glue line 44 will then join such strip to the trailing edge of the previously wound or lower strip 40.

Figure 22:
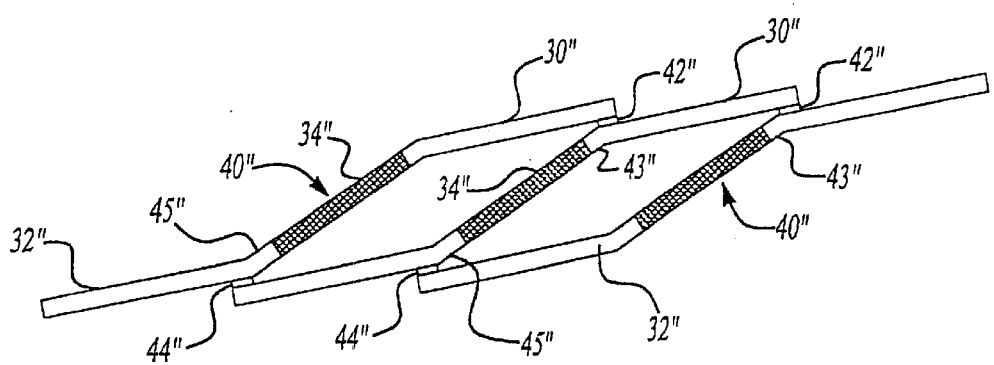
FIG. 22 is an enlarged, simplified view, similar to FIG. 3, but showing the configuration which results from a modified location of the glue line which joins successive three-element strips.

The choice of location of glue lines 42 and 44 relative to the junctions between the sheer and relatively opaque portions of each winding is not critical. FIG. 22 shows the identical three-element strip illustrated in FIG. 5, but with the front and rear glue lines 42", 44", respectively, shifted laterally away from the junction between the respective sheer and relatively opaque portions of each three-element strip. That relocation of the glue lines creates short tab-like extensions 43", 45" of the respective sheer portions, which tabs project into the interior of the cells defined by the sheers and vanes.

Initial indications are that these tab-like extensions 43", 45" appear to be beneficial. Fabric Venetian blinds which have the vane material connected essentially directly to the planes of the front and rear facings have a tendency not to fully close in the overlapping, light-blocking position. This phenomenon appears to result from the "memory" which the vanes retain of their shape in the open position. However, the optional use of sheer tabs 43", 45", resulting from relocation of the glue lines, places much less resilient sheer material in these flexing or hinging zones. The reduced memory and/or resilience of the sheer material allows the relatively opaque vanes to lay flatly against the faces, even if there is some residual splay in the weld joints. This benefit is even greater where the tab extends in the reverse direction from the vane, as in the case of the upper tabs shown in FIG. 27 as compared with the lower tabs of that Figure.

Furthermore, if the extreme edge of the center opaque vane (outboard of its weld to the sheer tab) overlays the sheer tab to a substantial degree, as is typical, then the reverse-style tab beneficially acts as a buttress against the facing when the vanes are pulled into the open, view-through position. The Vane must then adopt greater transverse flex and curvature, which is an established aesthetic benefit, rather than locally hinging as a stiff and flat element from the facing at the much softer sheer tab.

As exemplified by the configuration of FIG. 22, the relatively opaque portions need not fully span the distance between the front and rear facings, as long as the opaque portions overlap when the blind is in the fully closed position. Glue lines 42 and 44 may be spaced from the exposed, exterior edges of the strips, if desired, as when a series of unsupported, fringe-like bands are desired on one or both of the facing panels.

Figure 7:
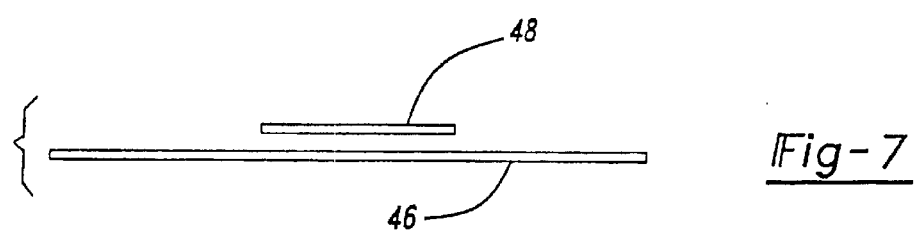
FIG. 7 is an exploded end view of a second form of the three-portion strip.
Figure 8:
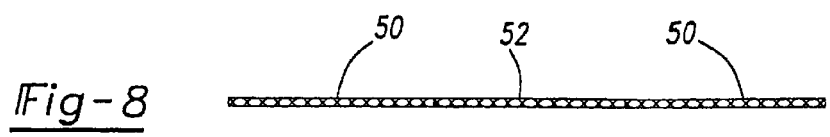
FIG. 8 is a view similar to FIG. 7, showing a third form of three-portion strip.

Alternative forms of the three-portion strip 40 are shown in FIGS. 7 and 8. In FIG. 7, the strip is formed of a full-width relatively translucent portion 46, with a relatively opaque central portion 48 laminated to it by any of the previously described joining techniques. This embodiment is not preferred, because it tends to be too stiff to hang uniformly. In the FIG. 8 embodiment, the three-portion strip is formed of a single piece of fabric, but with less dense weaving patterns being used for the outer portions 50, and a more dense or opaque weaving pattern being used for the central portion 52 which will become the vane of the finished blind. The embodiments of FIGS. 6 and 8 are preferred, because they tend to hang in a more uniform, wrinkle-free manner.

The method and equipment employed for fabricating the embodiment of FIGS. 3–5 is illustrated in FIGS. 9–17 of the drawings. The manufacturing equipment includes a pair of parallel, non-rotating spars 56,58 skewed at an angle to two parallel nip roll sets. The first nip roll set 60 serves to drive the fabric by tensioning the upper reach of fabric tube 88. Nip roll set 60 comprises a lower, motor-driven roll 62 and an upper, pressure roll 64. The second nip roll set 66 serves to provide tensioning drag and to steer fabric tube 88. It comprises a lower, motor-driven roll 68 (which is driven in a manner to tension or brake the span of fabric between it and drive nip roll set 60) and an upper, steering pressure roll 70. The steering action is described below. Rolls 62 and 68 may be driven by belt-driven sprockets (not shown). The fabric between nip sets is thus held flat and substantially planar for attachment of the infeeding strip, assuring that the final product will also lie flat.

The three-portion fabric strip 40 is fed from strip supply roll 72, which has its own drive motor M which drives roll 72 at a speed controlled by the position of dancer 73. If the strip loop around dancer 73 gets smaller, the motor driving roll 72 speeds up to maintain a uniform amount of strip in that portion of the strip feed system. Strip 40 continues from dancer 73 through a nip roll set comprising upper roll 74 and lower motor-driven roll 75 to tension-sensing roll 76, which is provided with a load cell on its axle. This load cell senses tension in the strip between rolls 76 and 64, and adjusts the speed of motor M associated with nip roll 75 to maintain the desired tension in that portion of the in-feeding strip.

Two adjacent glue applicators 78 apply continuous beads of glue 42,44 to strip 40.

The support structure for the two pairs of nip rolls 60,66 comprises main mounting plate 80 (see FIGS. 11–12) and end plate 82 connected thereto by cantilevered beams. End plate 82 supports the end of upper rolls 64,70 remote from main plate 80, while lower rolls 62, 68 are supported by similar cantilevered beams and end plate 82'. These end plates must be supported in this fashion so that no support structure crosses from inside to outside the fabric loop or tube 88 defined by spars 56,58. Spars 56,58 are cantilevered from a separate frame structure 84, which can be pivoted about vertical axle 86 to permit the spars to be set at a predetermined angle relative to the two nip roll sets. This angle is a function of the desired lead angle for the helical winding of strip 40, as will be explained below. Appropriate clearance holes are placed in frame 84 to permit passage of spars 56,58. The end of cantilevered spars remote from mounting frame 84 is free of connection to supporting structure to permit removal of the continuously formed fabric tube therefrom and to allow adjustment of the spar angle relative to the lower rolls. Alternatively, if spar angle adjustment were deemed unnecessary, the ends of the spars could be attached to the lower roll support or to any other structure lying entirely within fabric loop 88. Alternatively, the spars can extend far beyond the longest desired window shade and be supported to ground at both ends. In that case, the fabric tube must be cut open as described below to remove the fabric product from the spars.

Figure 9:
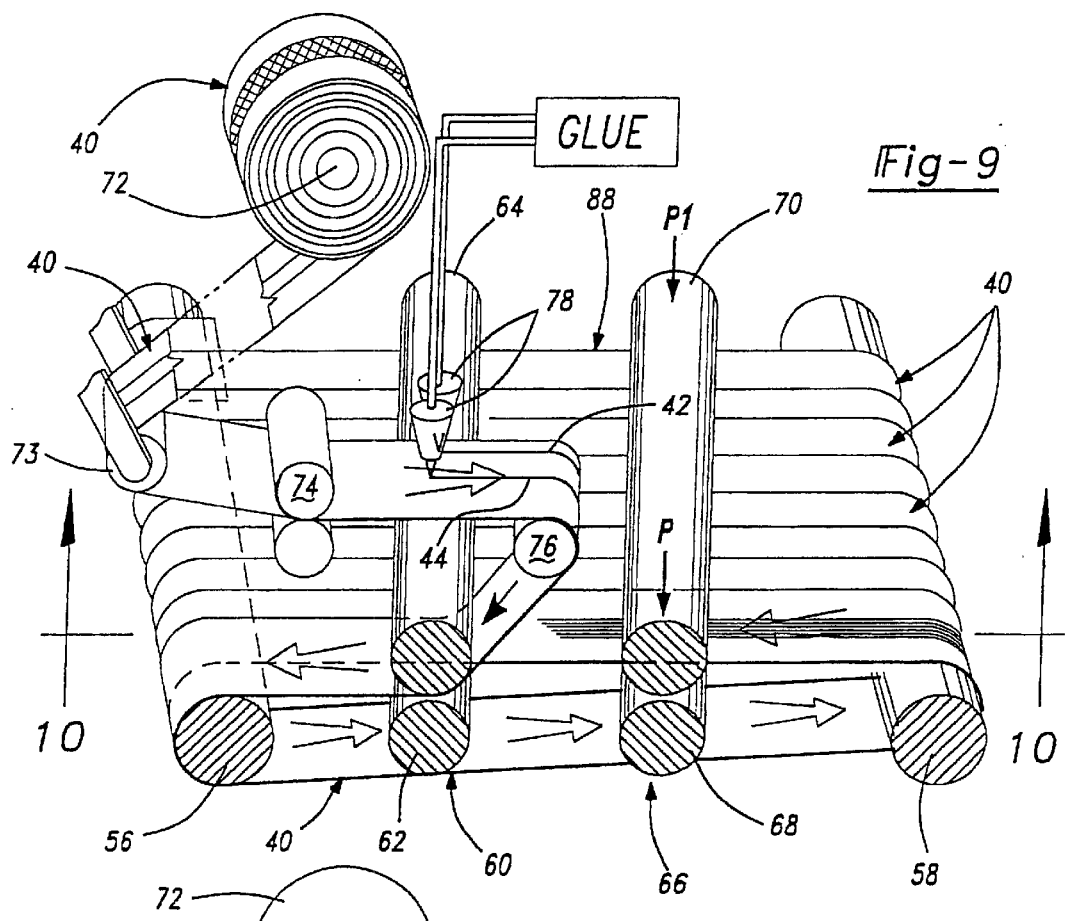
FIG. 9 is a simplified perspective view of equipment suitable for forming a blind according to FIGS. 3–5 using the process of the present invention.

As best shown in FIG. 9, the process begins with the three-portion fabric strip 40 being pulled from supply roll 72 by drive nip roll set 74–75. Controlled feed rate of the strip between supply roll 72 and nip roll set 60 is provided by motor-controlling signals from dancer 73. Constant tension in the strip between nip roll set 74–75 and drive nip set 60 is provided by motor-controlling signals from tension-sensing roll 76, as explained above. The strip is directed past glue applicators 78, and the upper, glue line-bearing side of the strip is inverted by roller 76 so that such glue lines come face-to-face with the preceding winding between the rolls of nip roll set 60. There, the glue joint is closed and the overlapping windings are bonded to each other.

As will be appreciated by reference to FIG. 5, the infeeding strip 40, with glue lines 42, 44 already applied by applicators 78, must precisely register with the preceding winding traveling on the upper reach of the fabric loop extending from spar 58, through drag nip roll set 66 to drive nip roll set 60, where infeeding strip 40 first comes into contact with the preceding winding for bonding. FIG. 9 shows how the skewing of spar 56 causes the lower reach of the endmost fabric strip winding to shift laterally as it travels to spar 58 and back to the point between the rolls of drive nip roll set 60 where the incoming strip, with freshly applied glue strips 42, 44 on its underside, is pressed against it. The lateral shift, a result of the helix lead angle, is selected to cause a shift of approximately one-third of the width of strip 40, so that glue lines 42, 44 will register with the previous winding as shown in FIG. 5. Thus, the required relative positioning of the relatively opaque vane portion 34 with the relatively translucent facing portions 30',32' will be achieved when the vanes of the finished blind are placed in their light-blocking or fully closed angular setting.

Precise control of the amount of overlap between successive windings is provided by two independent controllers. First, the lateral position of infeeding strip 40 from supply roll 72 is provided by a controller (not shown), or other known web guiding device, which laterally shifts the placement of roll 72 along its rotational axis.

Secondly, additional control of registration of the overlapping windings of strip 40 is provided by drag nip roll set 66, which has a "steering" capability. Both pressure rolls 64 and 70 are rubber-coated, to provide a compressible surface. Unlike pressure roll 64 of drive nip roll set 60, which has a constant force pressing it downward toward drive roll 62, steering pressure roll 70 has independently controllable downward pressure (described below) applied at its opposite ends. When the applied pressures are equal at both ends of roll 70, the roll has a strip-contact zone of uniform width along its entire length, where the rubber roll is deformed about the unyielding surface of roll 68. The passing fabric strip does not deviate from its straight-line path, and continues to take the shortest route from spar 58 to nip roll set 60. An increase in the nip pressure at one end of roll 70 increases the concavity of its rubber-coated surface as it is deformed by the cylindrical contour of the non-yielding surface of lower roll 68. The path of the fabric strip at that end of the roll lengthens as it is forced to assume the longer curved shape of the further deformed surface of roll 70. That is, the strip-contact zone (at that end) between the opposed rolls of nip roll set 66 increases to a greater segment of an arc about the rigid roll's surface resulting from the extra deformation of the surface of roll 70 straddling a lengthened portion of the perimeter of lower roll 68. The resulting longer strip path on the edge with increased steering pressure creates increased strip tension on that edge, pulling or steering the fabric toward that edge. Reducing pressure at one end similarly reduces the path there relative to the nominal condition, drawing the web toward its other edge.

Figure 15:
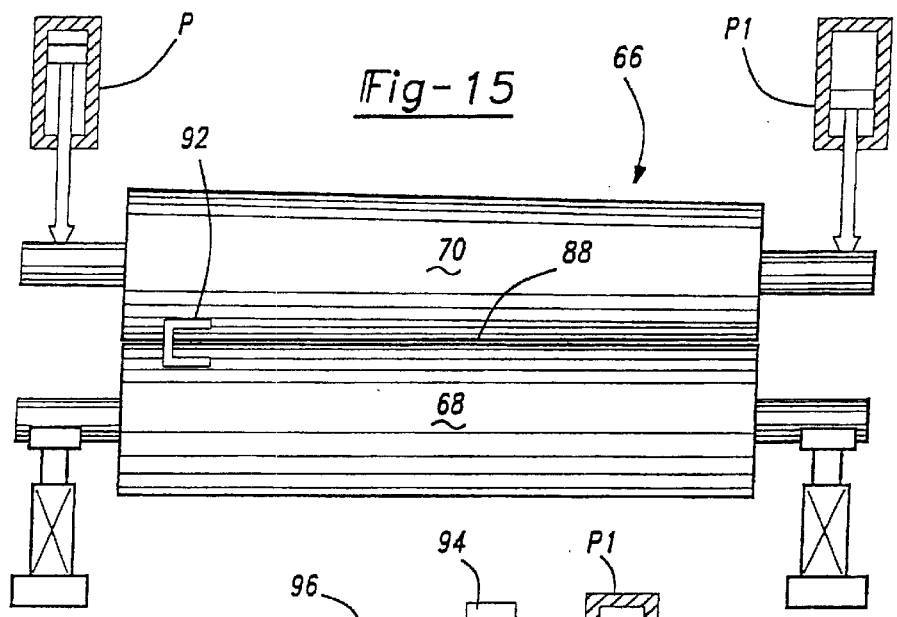
FIG. 15 is a schematic elevational view of nip roll set 66.
Figure 16:
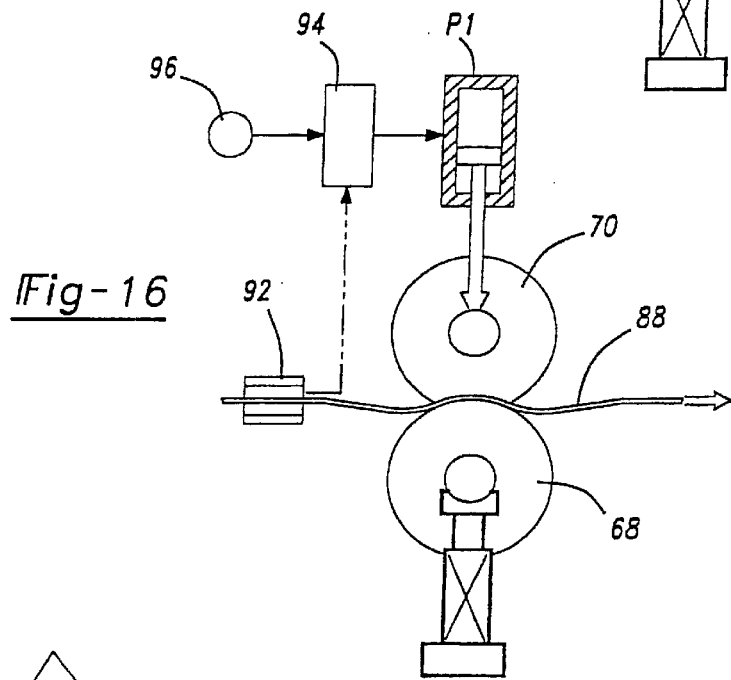
FIG. 16 is an end view of the nip roll set of FIG. 15.
Figure 17:
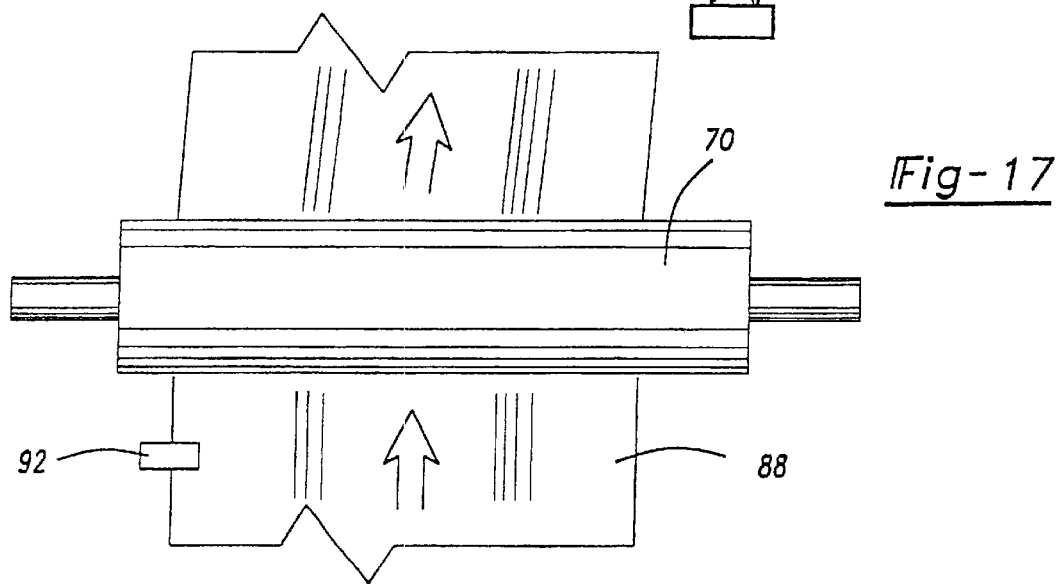
FIG. 17 is a plan view of the nip roll set of FIG. 15.

FIGS. 15–17 schematically illustrate a steering control system for varying the pneumatic pressure applied to cylinder P1 on one end of pressure roll 70. That end of pressure roll 70 is mounted in vertically slideable bearings. The control signal is provided by a proportional voltage output device in the form of an edge-position sensor 92, which may be in the form of a linear array of light-emitting outputs and photocells on opposite sides of the plane of the passing fabrics. Any deviation from the desired edge position of the strip generates a corresponding deviation from a nominal pressure-demand voltage signal sent by sensor 92 to control computer/proportional regulating valve 94. Valve 94 bleeds or supplies air pressure from source 96 as required to maintain a desired cylinder pressure defined by the voltage signal. The resulting tilting and deformation of roll 70 is shown in exaggerated form in FIGS. 15–16, and the corrected path of the upper reach of fabric tube 88 is shown in the plan view of FIG. 17.

While the use of crowned rolls to "steer" a web or flat belt to a central position, and the use of flared-end rollers to spread and de-wrinkle a web, are well known, it is believed that the use of a selectively deformable roller at a nip to steer a web by local control of path length is novel. Those skilled in the art will recognize that steering can be achieved either by varying the pressure on both ends, or maintaining nip pressure constant on one end while increasing or decreasing the pressure on the other end, as required.

Because fabric strip 40 has a helix lead angle as it winds onto spar 56 (which is skewed by such angle relative to drive nip roll set 60), the fabric "tube" 88 continuously advances toward the opposite end of the non-rotating spars. The spars, which do not rotate, are highly polished to facilitate this sliding movement without damage to the fabric.

The spars are preferably sufficiently long to permit them to hold an entire tube formed from a feed roll. For example, a machine has been built with twelve-foot long spars, for use with a three hundred-yard long feed roll. The spars may be perforated to permit pressurized air to provide an air bearing to reduce the drag of the fabric tube as it advances along the spars. When the machine is shut down to install a fresh feed roll, the tube may be cut off, using a scissors, by first cutting around the circumference of the tube, generally along a given strip. Alternatively, a razor knife may be plunged through the still-forming tube, just beyond the ends of nip sets 60, 66, and held in position for one full rotation of the tube. Then the knife is drawn quickly across the severed winding to separate the formed length of tube downstream from the still-forming tube upstream. The separated tube is then slid away along the spars and cut open along line C—C while the machine continues to form more tube. Then, the severed tube, while still hanging on the spars, is cut along a line C—C (see FIGS. 15–16), which is perpendicular to the edge of the windings, so that the tube may be laid open to form a parallel-edged flat form or slab 90 with the wound strips perpendicular to the parallel edges. If an automatic splicer is fitted to the supply roller 72, the operation of the machine can be thus made continuous.

In the presently constructed machine, the cut open product slab 90 is about ten feet wide and about ten or more feet long. The fabric slab is then cut to size for particular windows, and the fabric Venetian blind is fully formed except for its connection to a wind-up roll and associated hardware.

Many different products and visual effects can be achieved by use of the present invention. A basic Venetian blind may preferably be formed of polyester (for strength and UV resistance) knitted mesh front and rear, of different mesh patterns, and a knitted polyester relatively opaque fabric for the vanes. Where minimization of the moiré effect is not a primary concern, the same fabric may be used for the front and rear facing panels. A preferred fabric is a stabilized tricot of 28 gage 20/1 semi dull polyester, manufactured by Gehring Tricot Corporation, and identified as P201. Stabilized tricots provide a preferred combination of visual sheerness with a high degree of structural stability for ease in handling during manufacture. Where moiré effect minimization is a concern, then such fabric may preferably be paired with a rear facing fabric in the form of a diamond tulle, such as 36 gage, 20/12 bright polyester, manufactured by Gehring, and identified as P1732. The relatively opaque vane may be a jersey fabric, 70/33, 20/1 semi-dull textured polyester, like that manufactured by Native Textiles, and identified as P7020.

A significant advantage of the use of the helical strip-winding technique of the present invention is that the resulting front and rear sheer panels, being composites of multiple, narrow, horizontally disposed sheer strips, tend to suppress objectionable moiré effects which would arise if the same choice of fabrics were used in the form of single-sheet, continuous panels for the entire front and rear facings. Tricot type fabric, a preferred form of weave, has heavily barred patterns extending in the longitudinal or "machine direction" of the fabric as it is manufactured. When such barring is oriented in the vertical direction (of a normally hanging window shade) for continuous manufacture of single panel facing, a cross-grid pattern is established with the horizontally oriented vanes and vane shadows, leading to a relatively dramatic and objectionable moiré effect. With the strip-winding technique disclosed herein, the sheer strips and associated machine-direction bars of the tricot fabric can be oriented horizontally. In this orientation, the barring pattern does not form a cross grid with the vanes, but tends to blend in with the parallel vanes and vane shadows. Also, the multiplicity of narrow sheer strips acts to break up otherwise large-scale moiré patterns into smaller, more localized, banding patterns which are less objectionable. Still further, the individual sheer strips tend to be slightly tilted or bowed relative to each other, rather than more truly parallel, as in the case facing panels formed of single, continuous sheets. This fact, along with small, local differences in tension and alignment of individual threads in adjacent wraps, further diminishes large scale coherence in the moiré interference patterns.

Alternatively, other knits, wovens or nonwovens may be used for either the facings or vanes, and hot-melts, pressure sensitives, tapes or other adhesives may also be used, provided they possess UV resistance, non-yellowing and strength with no flow at up to 200 degrees Fahrenheit for durability in sunlit windows.

While many of the known glues can be used, hot-melt adhesives are preferred, such as the high-temperature polyester manufactured by Bostik and identified as 7199 or W4360B. This type of adhesive is advantageous because of the ability to be precisely metered through application nozzles, high initial tack, rapid cure to a flexible final state, ultraviolet resistance for use in sunlit windows and minimum of bleed-through adhesion as a result of the rapid cooling of its surface once applied. Alternatively, moisture-cure polyurethane hot-applied glue, such as HL-9608 manufactured by H. B. Fuller, has many of the same features, plus added strength and flexibility once cured, but these benefits must be considered in light of slower curing and associated bleed-through tendencies.

Another alternative Venetian blind product which may be formed by this helical winding technique would use fabric of uniform light-transmitting ability throughout. That is, instead of a three-segment strip of varying opacity, the winding strip could be made of a single, ultralight, non-woven fabric. In the "open" position, light would be filtered through two layers (the front and rear composite facings), while in the partially and fully closed positions, it would be further filtered through the vane layer of fabric, causing an additional fifty percent diminution in the light transmission through the blind. If angle-dependent polarizing material were used, further control of the light transmission could be obtained.

Because this helical winding process permits use of narrow strips of material to form the composite facing panels, the face panels can be formed of lace material. Heretofore, continuous sheet facing panels were too wide to permit lace to be used at an acceptable price. Also, it would be difficult to match the pitch of the finished shade to the repeats of the wide-goods lace. As further alternatives, the vane portion may be a thin wood veneer laminate, or printed cloth with different colors on its opposite sides.

Figure 18:
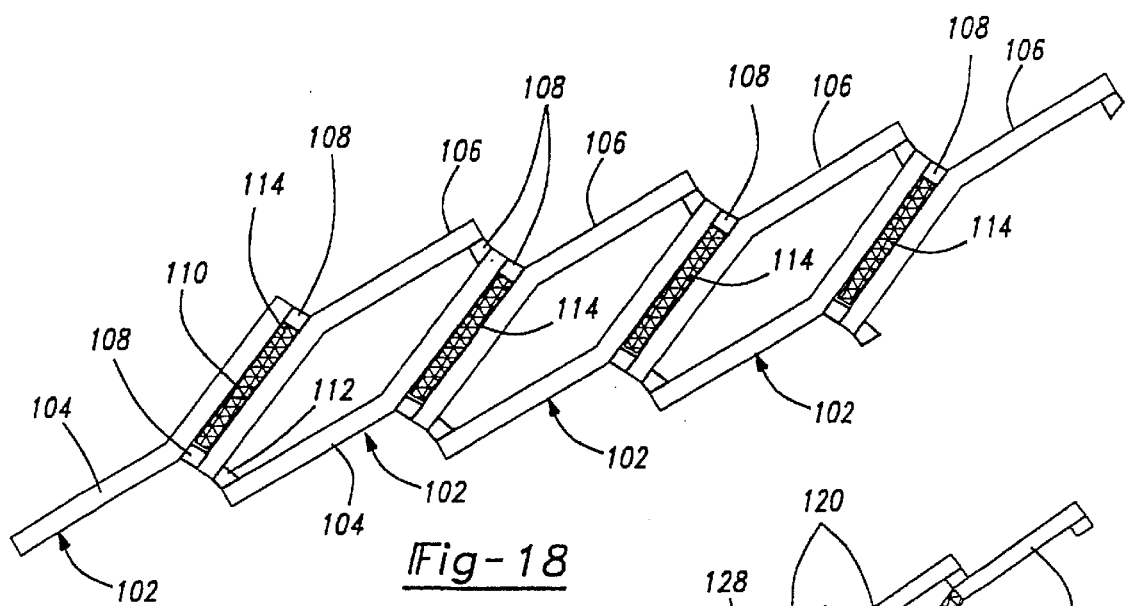
FIG. 18 is a view similar to FIG. 5, showing an alternative embodiment having pockets to receive opaque vane inserts.

The modified embodiment of FIG. 18 is similar to the embodiment of FIG. 5, but employs a different means of opacifying the center or vane portion of each strip. These pocketed strips 102 each comprise overlapping rear and front sheer facings 104, 106, respectively, pre-joined (i.e., prior to winding) by glue lines or ultrasonic junctions 108. The central overlapping thirds and glue lines define an insert-receiving pocket 110. Strips 102 are wound and bonded together at glue lines 112, as in the previously described embodiment of FIGS. 5, 9 and 10. Later, after cutting open the helically wound tube, opaque inserts 114 may be inserted in pockets 110 to provide the desired opaque vanes. As a further alternative, the pocketed strips can have the sense of the overlap reversed. That is, front sheer facing 106 can overlap rear sheer facing 104. Alternatively, the individual facing strips 104, 106 and a continuous strip of opaque insert 114 can be helically wound together by use of multiple feed rolls 72 appropriately positioned to feed with the desired overlaps onto the winder.

Figure 19:
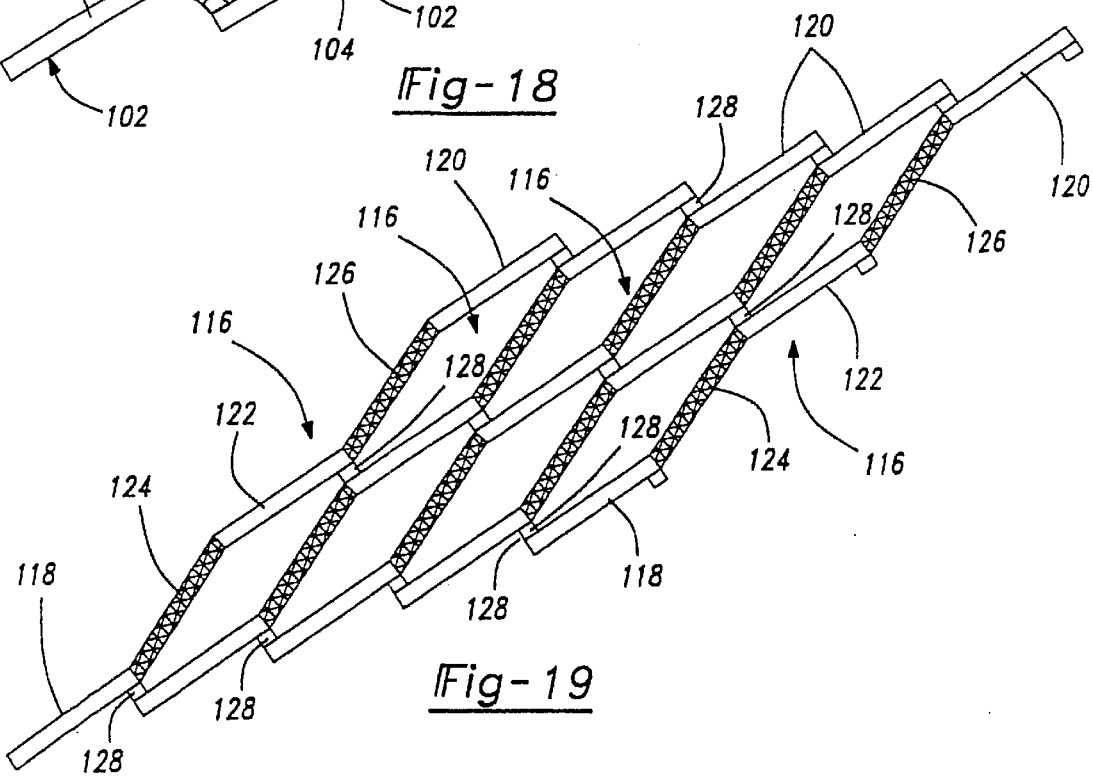
FIG. 19 is a view similar to FIG. 5, showing still another alternative embodiment wherein multiple rows of vanes or central ligaments are provided.

FIG. 19 illustrates an example of a double-deep structure having multiple rows of vanes or central ligaments. Each strip 116 comprises five segments, namely, rear, front and central sheer portions 118, 120, 122, respectively, and first and second opacified portions 124, 126, respectively. Successive strips are helically wound and bonded together at glue lines 128, as previously described. Opacified portions 124, 126 could have different degrees of opacity, so that, depending upon which column of vanes was closed, a light-blocking or a semi-translucent mode could be selected. Alternatively, these two portions could be cross-polarized to provide a choice of opacities. With both vanes fully open, a transparent light path would be provided through the aligned sheer portions 118, 120, 122.

By shortening the length of central ligament or sheer portion 122, it will "go straight" or taut before the front and rear facings, providing uniform pitch for the hanging blind, and allowing the front and rear facing segments 118 and 120 to assume a softer, slightly looped or curving, appearance.

Figure 20:
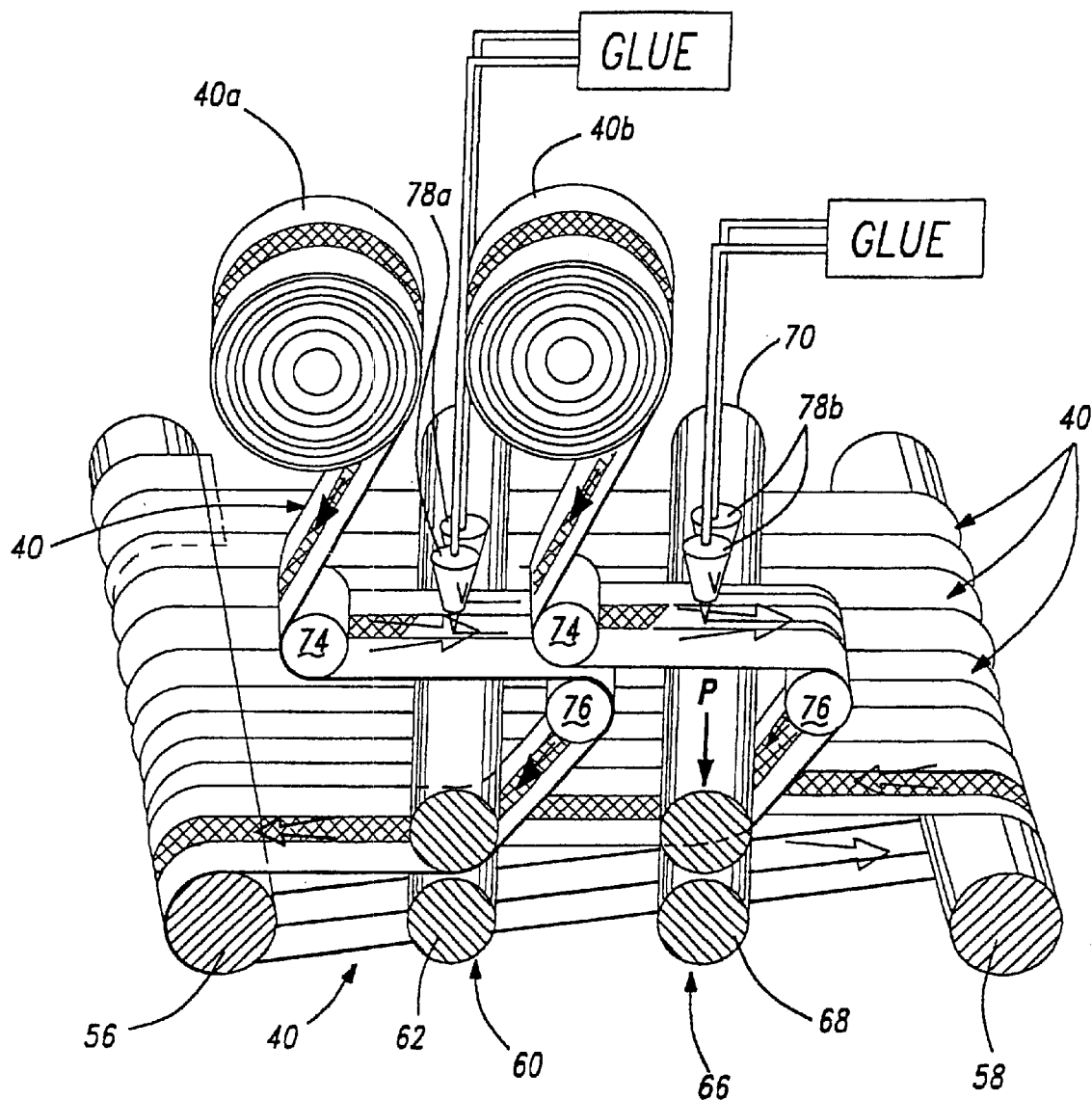
FIG. 20 is a view similar to FIG. 9, showing a modified system for feeding the fabric strip to the winding equipment.

In an alternative winding process, a multi-lead winding arrangement can be employed. A first such arrangement, illustrated in FIG. 20, introduces a second distinct pre-formed three-portion strip 40b from a separate supply roll 72. For the simplicity of illustration, dancer 73 has been omitted from this Figure, as well as from the further alternative illustrated in FIG. 21. A similar pair of glue nozzles 78b is provided to apply glue stripes to strip 40b in the same manner and location as in the case of the primary strip 40a. Because the fabric loop or tube 88 is lengthened by two non-overlapping strip portions per revolution, rather than one, the helix lead angle must be doubled. That is, the angle between spars 56, 58 and nip sets 60 and 66 must be doubled.

Figure 21:
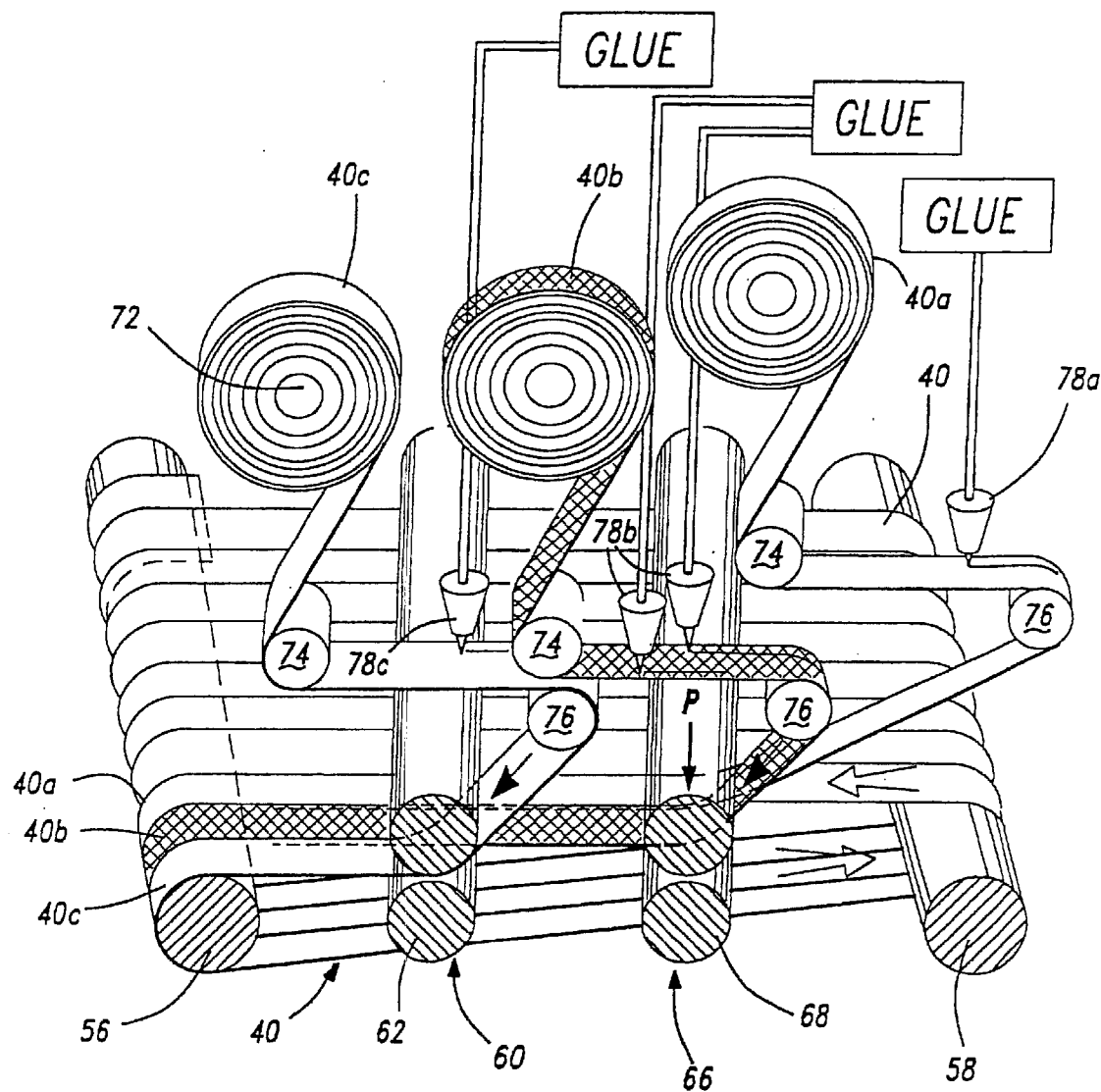
FIG. 21 is a view similar to FIG. 9, showing another modified system for feeding the fabric strip to the winding equipment.

A second multi-feed arrangement is illustrated in FIG. 21. Instead of feeding a pre-formed three-portion strip from supply roll 72, the individual portions of the strip can be fed from separate supply rolls and joined to each other (with minimal overlap) as they are laid upon and joined to the previously applied winding of fabric tube 88. These junctions are preferably achieved by ultrasonic welding, but glue lines may alternatively be used. In FIG. 21, three supply rolls simultaneously feed separate strip portions 40a, 40b and 40c. Only a single glue line (from nozzle 78a) is required to secure portion 40a to the prior winding or wrap.

Similarly, only a single glue line (from nozzle 78c) is required to secure central portion 40c to adjacent portion 40b of the same wrap. However, two widely spaced glue lines (from nozzles 78b) are required to join central portion 40b to portion 40a of the same wrap and to separately join portion 40b to portion 40c of the prior wrap. Note that two or more strip portions (here, portions 40a and 40b) can be fed into the fabric loop at the same place, i.e., at nip set 66, with an offset equal to the desired offset per lap or wrap. A strip portion (here, portion 40c) can also be fed in at a separate location on the fabric loop, i.e., at nip set 60. As long as the feed-in locations are within the flat portion of the fabric loop 88, the offset remains equal to the desired offset per lap in the finished goods.

Figure 23:
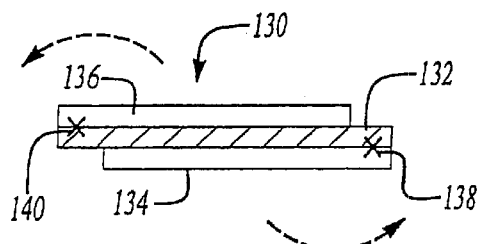
FIG. 23 is an end view, with the vertical scale exaggerated, of a prior art three-element strip configuration.

FIG. 23 shows, with the vertical scale exaggerated for clarity, a prior art three-element strip construction used to form the fabric Venetian blind disclosed in U.S. Pat. No. 5,888,639. Strip 130 comprises an opacified vane portion 132 whose opposite longitudinal edges are ultrasonically welded to front and rear sheer strips 134, 136, respectively (each shown as a small "x"), at weld lines 138, 140 respectively. The relatively opaque strip is wider than the sheer strips, and the sheers are aligned with the opposite edges of the opaque strip. Thus, there is only one sheer present at each edge, allowing a through-welding of one sheer to each edge of the relatively opaque strip. This prior art process then subjects the welded three-element strip to a series of operations, including edge trimming, opening of the welded joints (as shown by dotted lines in FIG. 23), and flattening to ultimately obtain a flattened, three-element strip. The resulting strip is then cut to a length corresponding with the width of the window into which the blind is to be inserted. The cut-to-length strips are then, according to this prior art disclosure, stacked and bonded together, using a technique substantially different from the helical winding technique disclosed herein.

Figure 24:
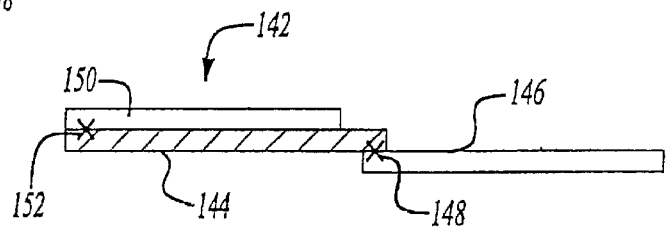
FIG. 24 is an end view, similar to FIG. 23, showing one of the modified three-element strip configurations of the present invention.

FIG. 24 is a view similar to FIG. 23, but showing a modified three-element strip construction according to one embodiment of the present invention. Unlike the three-element strip constructions of each of FIGS. 6, 7 and 8 of the present invention, and also unlike the prior art configuration of FIG. 23, the construction of three-element strip 142 of FIG. 24 comprises a relatively opaque strip 144 to which one sheer strip 146 (which may be the front sheer strip) is lapped slightly thereunder and preferably ultrasonically welded at weld line 148, just as in the embodiment of FIG. 6, while the other sheer strip 150 (which may be the rear sheer strip) is aligned with the opposite edge of relatively opaque strip 144, and in fully overlapping relationship thereto, and welded at weld line 152.

Figure 25:
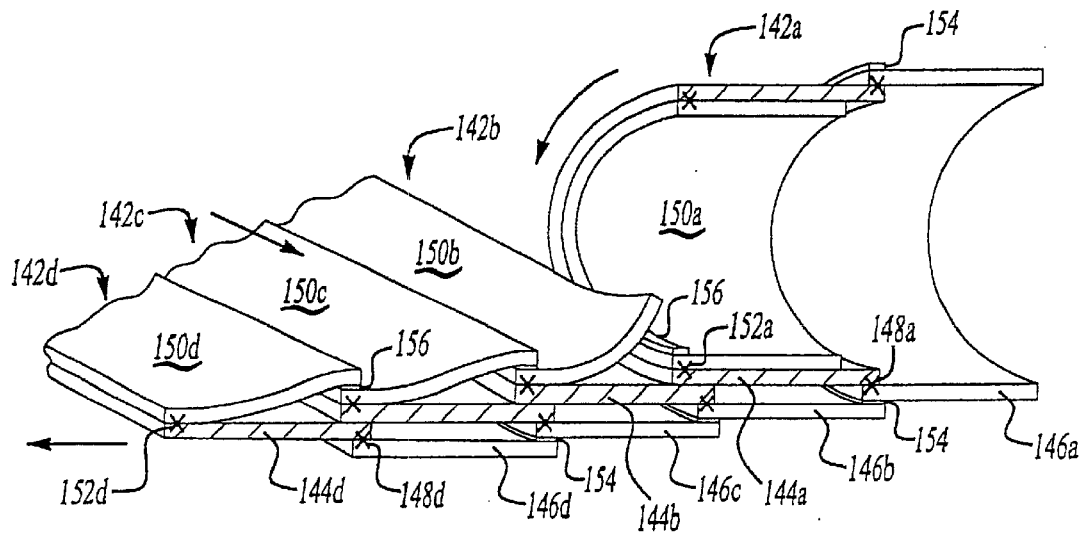
FIG. 25 is a fragmentary perspective view, with the vertical scale exaggerated, of a portion of the helical winding sequence used in conjunction with the three-element strip configuration of FIG. 24.

The resulting "half-lapped" three-element strip 142 is then helically wound, as shown in FIG. 25, with the double-thick edge of incoming strip 142a closer to the previously formed winding 142b of the helix. FIG. 25 is a view generally in the direction of left to right in FIG. 9, but showing a modified assembly sequence adapted for winding the half-lapped strip 142. For clarity of illustration only, drive nip roll set 60, tension sensing roll 76 and idler roll 162 have been omitted from FIG. 25. This fragmentary perspective view shows the incoming strip 142a as it turns over the omitted tension sensing roll 76 and idler roll 162 just prior to interfitting with the immediately preceding wrap 142b. As is evident in FIG. 25, the trailing edge of the helix, namely, the free edge of rear sheer strip 150b, is temporarily lifted up or partially curled back from underlying opaque strip 144b by picker or finger 164 just upstream from the zone where the incoming three-element strip 142a is brought into alignment to join the previously wound helix. This lifting action permits the double-thick edge of incoming strip 142a to enter that gap beneath rear sheer strip 150b and slightly overlap relatively opaque strip 144b.

Figure 10:
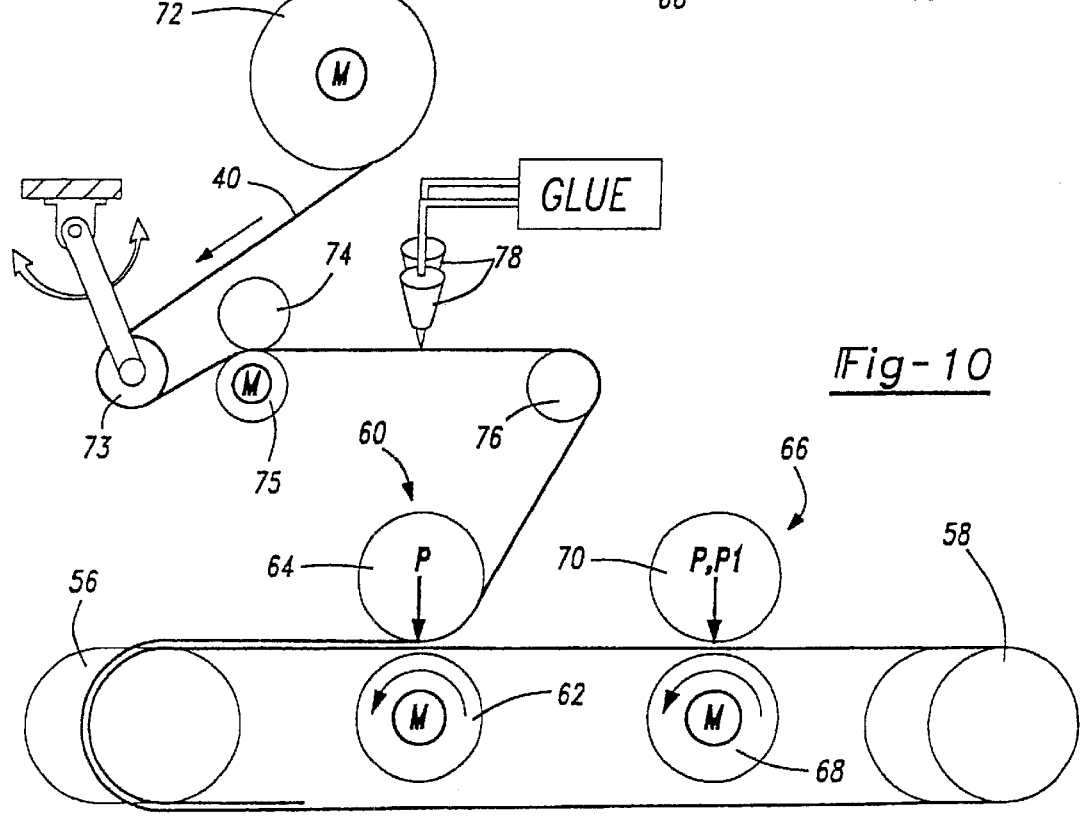
FIG. 10 is a schematic side elevational diagram of the equipment shown in FIG. 9.
Figure 11:
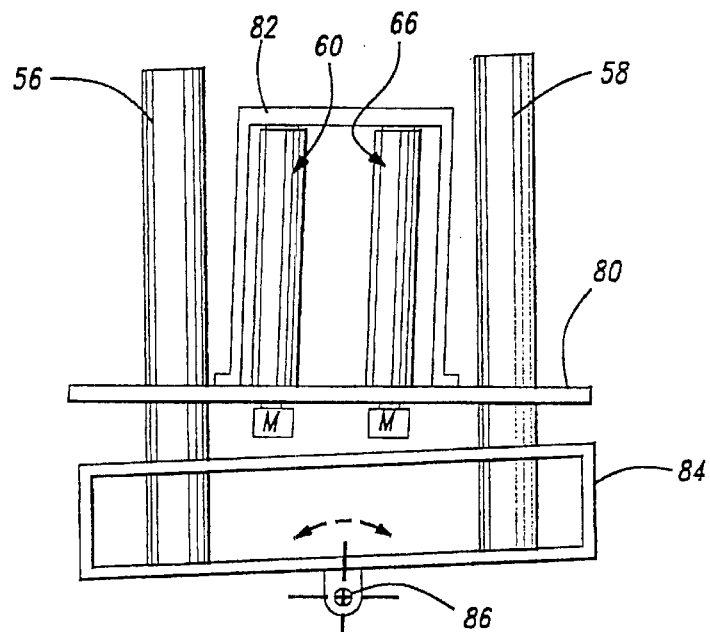
FIG. 11 is a simplified plan view of the equipment of FIG. 9, showing the supporting framework.
Figure 12:
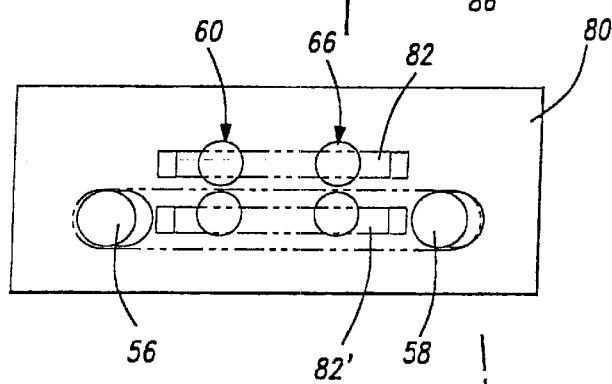
FIG. 12 is a simplified side elevational view of the equipment of FIG. 11.
Figure 13:
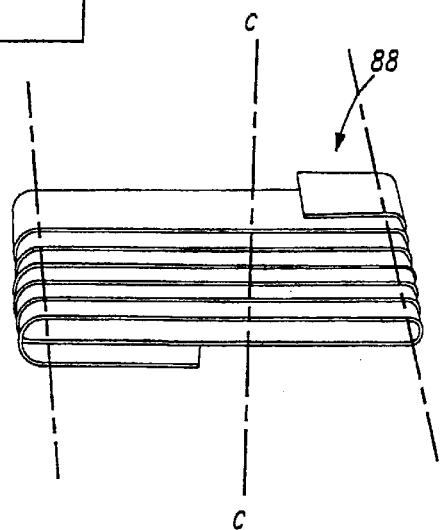
FIG. 13 is a perspective view of a helically wound tube of blind material, prior to being cut open, viewed from the opposite end of the spars from the end shown in FIG. 9.
Figure 14:
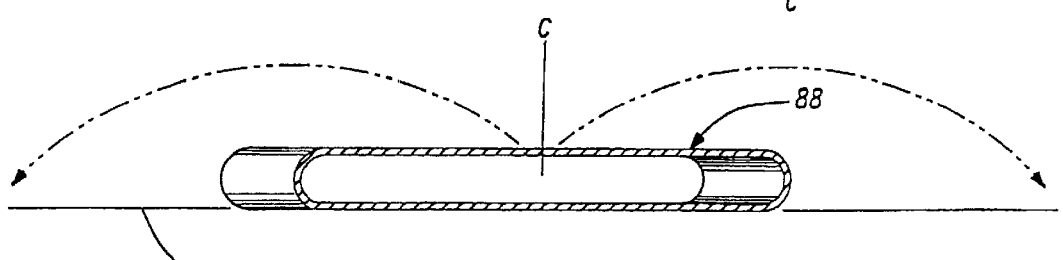
FIG. 14 is a schematic end view, in the direction of the cutting plane C—C, of the helically wound tube showing how it is cut open to form a full-width fabric Venetian blind.
Figure 30:
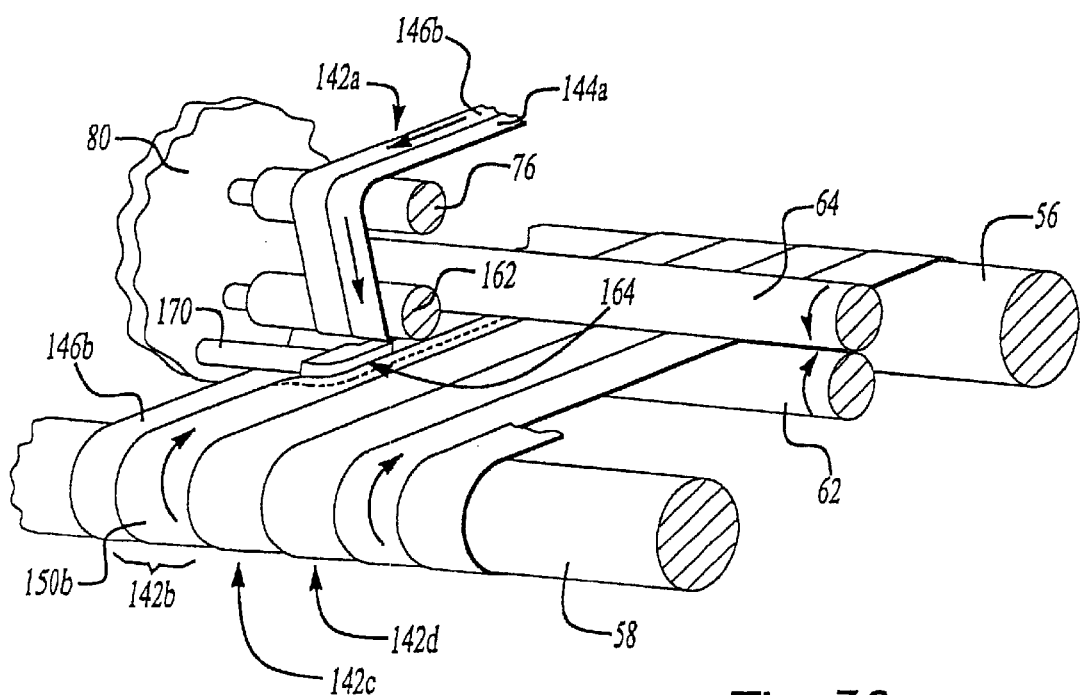
FIG. 30 is a fragmentary perspective view of a portion of the winding apparatus adapted for use with the three-element strip of FIGS. 24–26.
Figure 31:
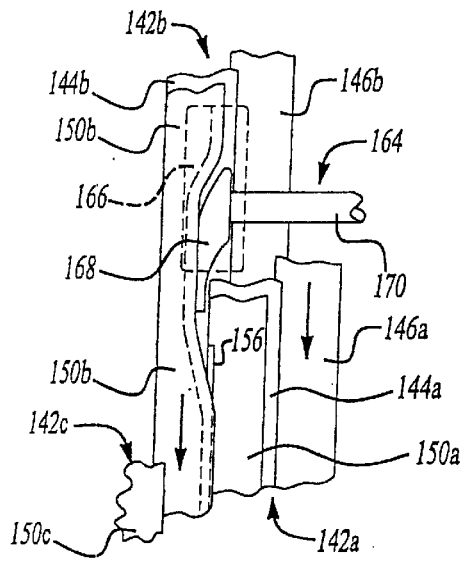
FIG. 31 is a fragmentary plan view of a portion of the winding apparatus illustrated in FIG. 30.
Figure 32A:
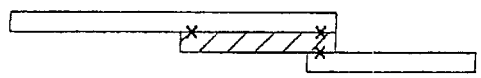
FIGS. 32a–32b through FIGS. 38a–38b are end views, similar to FIG. 23, showing additional alternative embodiments of three-element strips according to the present invention, and wherein the "a" and "b" figures of each pair show the strip in its flattened configuration after welding and in its partially opened, light-admitting configuration (as achieved after assembly with other such strips in a light-controlling product, respectively.
Figure 32B:
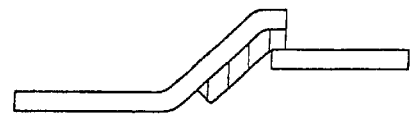
Figure 33A:
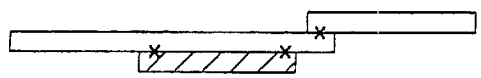
Figure 33B:
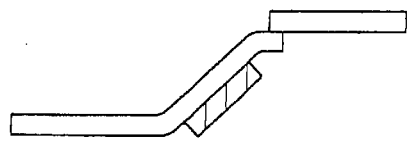
Figure 34A:
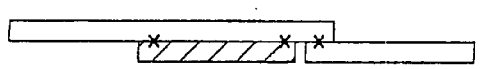
Figure 34B:
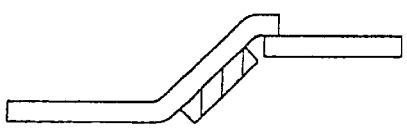
Figure 35A:
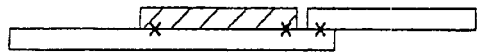
Figure 35B:
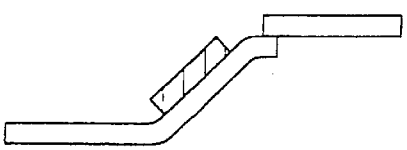

The lifting action is accomplished by a finger 164 illustrated in FIGS. 30–31. Only a slight modification to the winding apparatus of FIGS. 9–10 is required to adapt it to the use of half-lapped three-element strip 142. The fragmentary perspective view of FIG. 30 is taken generally in the direction of left to right in the unmodified apparatus of FIG. 9, but with drive nip roll set 60, tension sensing roll 76 and idler roll 162 (which is added for use with strip 142) omitted for visual clarity only. FIG. 31 is a fragmentary plan view of the zone of FIG. 30 where the incoming strip 142a is engaged by finger 164 and interfits with the preceding winding 142b.

As compared with the apparatus illustrated in FIGS. 9–10, two structural changes appear in FIGS. 30–31. First, idler roll 162 has been added, to re-direct the infeeding strip so that it has a horizontal run immediately upstream of nip rolls 62, 64. This horizontal run is necessary so that the incoming and preceding windings can be properly interfit with each other for bonding. Second, finger 164 has been added as an aid in opening up the trailing free edge of rear sheer strip 150b of the preceding winding so that it can receive the double-thick edge of incoming strip 142a.

Referring to FIGS. 25, 30 and 31, it will be seen that the trailing free edge of rear sheer strip 150b is pushed laterally and lifted slightly by finger 164, which is mounted on the end of support rod 170. To accomplish that shifting, finger 164 has a lower horizontal ledge portion 166, shown in dotted lines in the plan view of FIG. 31, which the free edge of sheer strip 150b rides upon as it moves toward idler roll 162. As a portion of such strip edge is lifted onto ledge 166, it is then engaged by a generally vertical leg 168 of finger 164. Vertical leg 168 cooperates with horizontal ledge portion 166 to laterally shift as well as lift the edge of strip 150b for a sufficient longitudinal running length to permit the double-thick edge of incoming three-element strip 142a, which is offset from the previously wound wrap 142b by the helix lead, to overlap the relatively opaque and lower or front sheer portions 144b and 146b, respectively, of previously wound wrap 142b, and tuck in underneath the lifted edge of upper or rear sheer 150b.

Application of front glue line 154 is accomplished by an applicator (not shown) located immediately above the double-thick, interfitting edge of rear sheer strip 150a and downstream from idler roll 162, that is, at a point where the free edge of the rear sheer strip 150b of the preceding wrap is still curled back to expose the glue-receiving edge of strip 150a (see FIGS. 25 and 31). After that overlapping relationship is established between the double-thick edge of incoming strip 142a and the underlying relatively opaque vane 144b of previously wound strip 142b (see FIGS. 25 and 31), the overlapping portion of strip 142a moves beyond vertical leg 168 of finger 164 (i.e., below the finger as viewed in FIG. 31) and returned to a flat-lying condition. The underside of the now lowered free edge of rear sheer strip 150b will then contact glue strip 156 on the upwardly facing edge of incoming rear sheer strip 150a to permit the required bond to be created.

Figure 27:
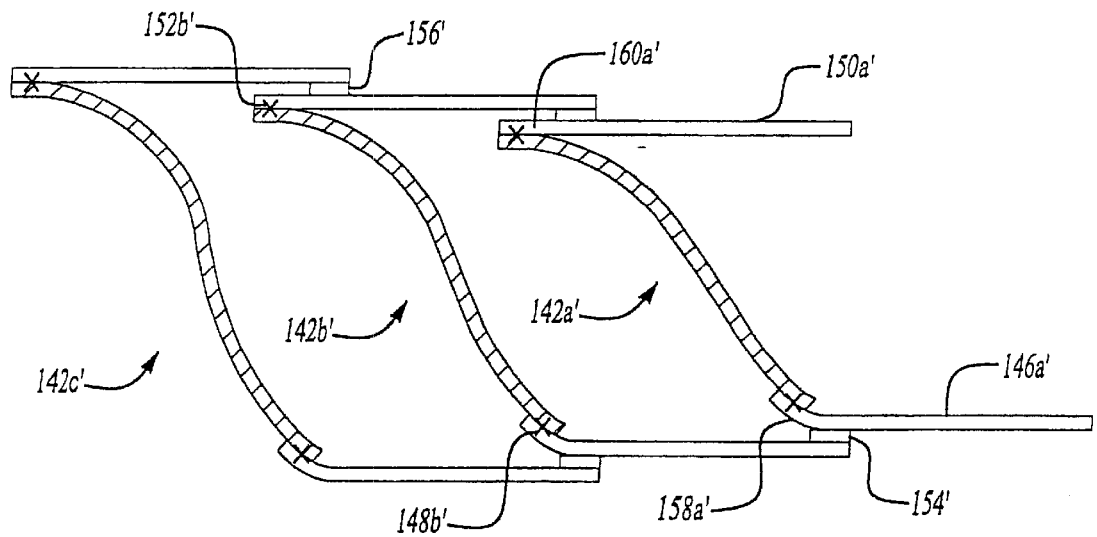
FIG. 27 is a view similar to FIG. 26, but showing the configuration which results from a modified location of the glue lines which join successive three-element strips.

The horizontal ledge portion 166 of finger 164 may serve an additional purpose. Where the glue line is shifted away from the underlying welded joint, as shown in the embodiment of FIG. 27, there is a tendency for the glue to bleed through the underlying sheer and temporarily form a fragile, weak attachment to the underlying relatively opaque vane. This unintended attachment would typically break the first time that the cells are fully opened, allowing the assembled panel to function normally, with the vanes fully free except at their welded joints. However, assuring such spontaneous separations occur uniformly and totally throughout the entire product may require a closer and more costly control of glue application than otherwise necessary. This problem can be completely avoided by dimensioning ledge portion 166 so that its left edge (as viewed in FIG. 31) is positioned to separate any temporary glue attachment resulting from bleed through of glue between sheers 150*b* and 150*c*.

Referring again to FIG. 25, front glue line 154 has already been applied to front sheer 146*a* of incoming strip 142*a* before it makes the turn around roll 76, as shown in the upper right of portion FIG. 25. Thus, glue line 154 will be properly positioned on the lower side of the strip for engagement with and bonding to preceding front sheer 146*b*. Rear glue line 156, however, must be on the upwardly facing side of rear sheer strip 150*a* in order to engage and bond to the underside of the uplifted trailing edge of rear sheer strip 150*b*. Therefore, the applicator (not shown) for glue line 156 must be located to apply the glue after the strip has passed roll 76 and before it passes under drive pressure roll 64.

Figure 26:
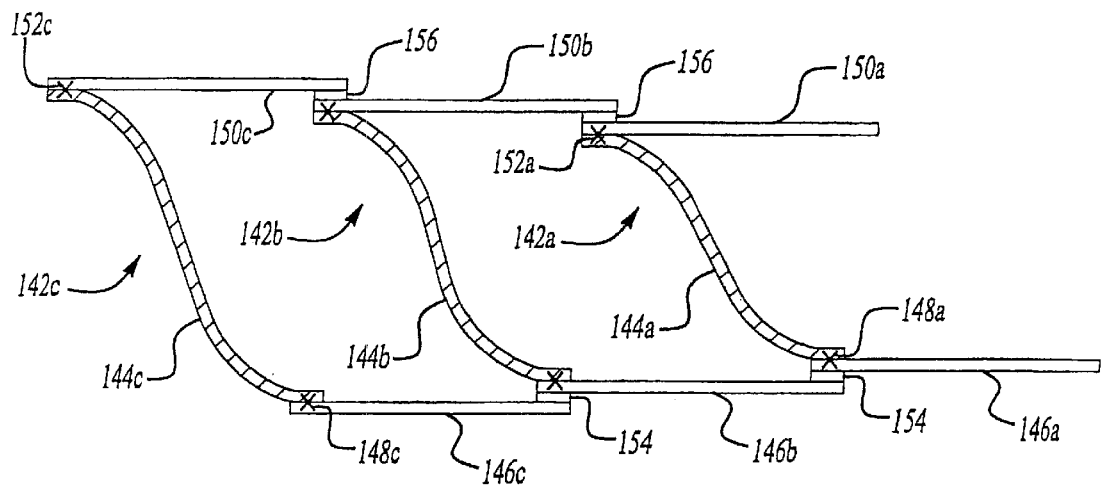
FIG. 26 is an enlarged fragmentary side view of the blind which results from use of the three-element strips of FIG. 24.

The resulting helix is cut open, as previously described, and cut to size for particular windows. FIG. 26 shows the end view of the resulting cellular structure in its partially open condition. It is evident that, in contrast to the structures of FIGS. 3–8, the two sheer strips of a given three-element strip form the front and rear portion of the same, rather than adjacent, cells. Significantly, another difference is that the direction of lapping of adjacent facing segments is the same on both the front and rear of the resulting panel. That is, e.g., rear sheer segment 150*b* overlaps adjacent rear sheer segment 150*a*, just as front shear segment 146*b* overlaps adjacent front sheer segment 146*a*. This configuration is advantageous in that, if the fabric Venetian blind is mounted so that the overlap is oriented shingle style, both front and rear facing panels will be so oriented, and the exposed sheer edges will less likely to collect dust or fray from contact with downwardly directed cleaning strokes or falling objects.

Furthermore, overlaying one of the sheer strips onto the stiffer relatively opaque vane reduces the instability of the three-element strip, thereby improving wrap-to-wrap alignment and the smoothness of the assembled composite facing panels. This advantage is particularly beneficial when using extremely fine knits such as diamond tulle, which is preferred in conjunction with a tricot knit for the opposite face when reduction of the moiré effect is desired.

FIG. 27 shows a modified version of FIG. 26. As in the difference between the embodiments of FIG. 22 and FIG. 5, the modification results from a shifting of the location of glue lines 154' and 156'. The relocation of the glue lines away from the weld lines 148, 152, respectively, creates inwardly projecting front and rear sheer tabs 158' and 160', respectively.

Figure 28:
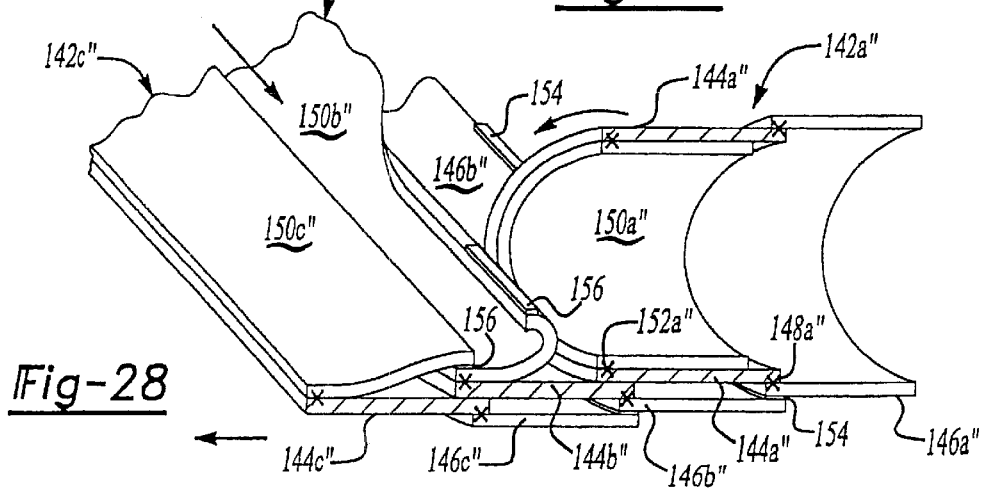
FIG. 28 is a view similar to FIG. 25, but showing the glue lines initially applied to the opposite element of the opposed elements to be joined.

FIG. 28 shows the same three-element strip structure and orientation as shown in FIG. 25, except that glue lines 154 and 156 have been initially applied to the opposite elements of the to-be-bonded surfaces. That is, front glue line has been shifted from the lower side of the left edge of incoming front sheer strip 146*a* (as shown in FIG. 25) to the upper side of the right edge of the front sheer strip 146*b"* of the preceding wrap of the helix (as shown in FIG. 28). Similarly, rear glue line 156 in the FIG. 28 illustration is applied to the curled back, upwardly facing, underside of the rear sheer strip trailing edge of the previously wound three-element strip 142*b"*. An appropriate picker or finger (not shown) would be provided to temporarily curl back and invert that trailing edge of rear sheer strip 150*b"*.

Figure 29:
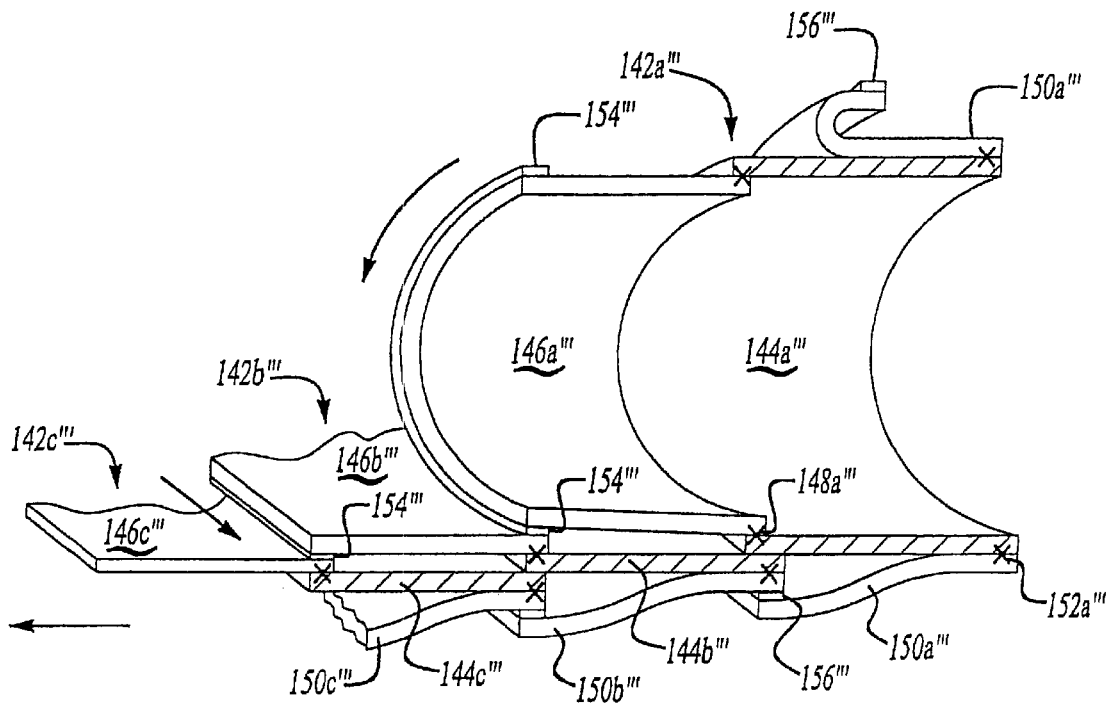
FIG. 29 is a view similar to FIG. 25, but showing a modified orientation of the three-element strip of FIG. 24 as the strip is fed into the helical winding apparatus.

FIG. 29 shows a further modification of the manner of winding the three-element strip of FIG. 24. In this embodiment, the orientation of the strip is reversed, with the double-thick edge of the previously wound strip trailing rather than leading. Therefore, the free edge of the incoming rear sheer strip 150*a'''* must be opened and curled back to receive rear glue line **156'''* and to permit entry of the double-thick trailing edge of preceding wound strip 142*b'''*, and then uncurled to enclose such trailing edge. This arrangement presents greater alignment and guidance difficulties, and is therefore not preferred.

FIGS. 32*a*–32*b* through FIGS. 38*a*–38*b* show additional embodiments of three-element strips. As in the case of FIGS. 23 and 24, the proportions of the strips in these drawings are exaggerated for clarity, and the location of the weld lines is shown with an "x". The relatively opaque vanes are shown with cross-hatching. Within each numbered pair of drawings, the "a" Figure shows the three strip portions in their flattened condition as welded, while the "b" Figure shows the three-element strip partially opened as it would be in the light-admitting position within a fabric Venetian blind.

Figure 36A:
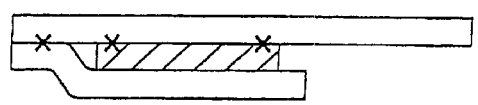
Figure 36B:
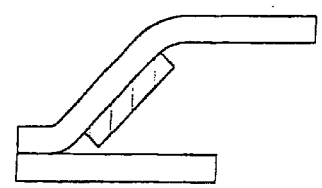
Figure 37A:
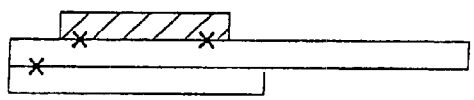
Figure 37B:
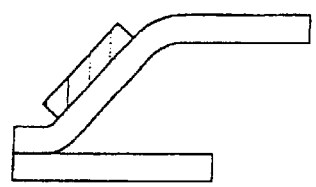
Figure 38A:
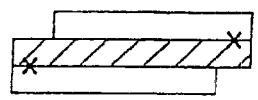
Figure 38B:
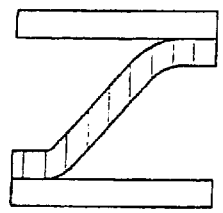
Figure 39A:
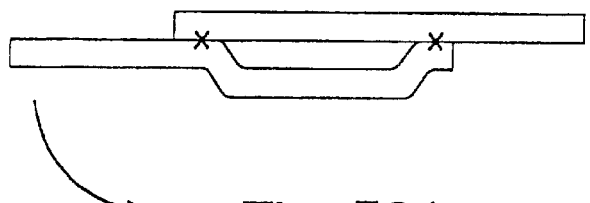
FIGS. 39a–39b through FIGS. 42a–42b are end views, similar to FIGS. 32–38, showing still further alternative embodiments, wherein two-element fabric strips are welded to form a pocket for subsequent reception of an opaque material.
Figure 39B:
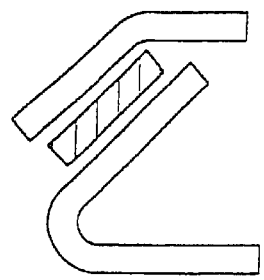
Figure 40A:
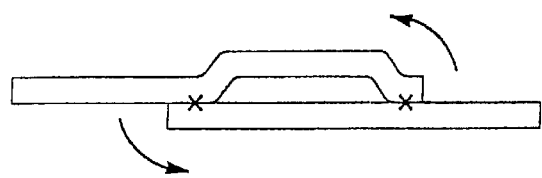
Figure 40B:
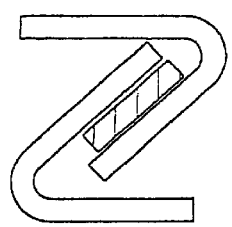
Figure 41A:
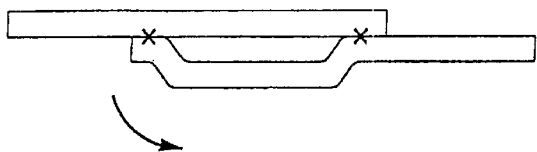
Figure 41B:
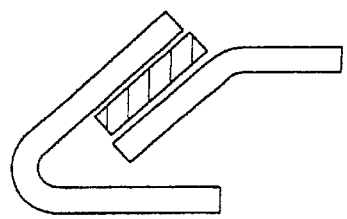
Figure 42A:
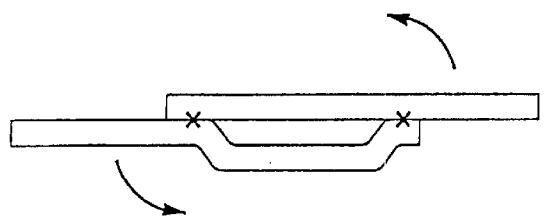
Figure 42B:
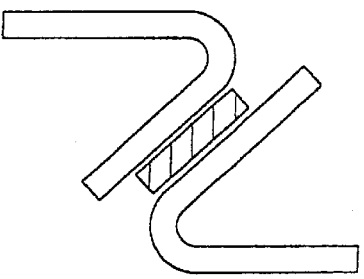

In the light of the foregoing explanation of the winding and assembly technique employed with the embodiment of FIG. 24, those skilled in the art will understand how to wind and assemble these alternative three-element strip configurations. The embodiments of FIGS. 36–42 would require, during the winding operation, a temporary lifting of the previously wound upper sheer free end to allow tucking under the edge of the incoming three-element strip, as described above with reference to FIGS. 25 and 30–31. It will also be recognized that a choice exists as to which element will overlap the other at the required glue joints between adjacent three-element strips. That is, by way of example, each of the glue joints required for adjacent three-element strips according to the embodiments of FIGS. 32–35 can only be made with the incoming winding as the overlapping element at each joint. Conversely, in the embodiments which are generally Z-shaped, such as FIG. 38, both free edges of the incoming three-element strip can be either overlaid or tucked under the corresponding portion of the previously wound three-element strip. In the configurations of FIGS. 36 and 37, the upper sheer (as shown in the Figures) can only overlap, whereas the lower sheer can overlap or tuck under, as desired.

The embodiments of FIGS. 39–42 show two-element strips which are formed with a pocket for subsequent insertion of a preferably semi-rigid opaque vane, which vanes are shown in the "b" Figures of each numbered pair. Otherwise, the same winding and assembly considerations as discussed above apply.

As discussed with respect to the embodiment of FIG. 27, each of these embodiments of FIGS. 32–42 can be constructed as shown, with the glue line between adjacent windings essentially overlying previously formed weld joints in the overlapped winding, or they may have the glue line shifted laterally away from such weld line (as shown in FIG. 27), creating a short, inwardly projecting sheer tab or ligament.

While the helical winding technique disclosed herein is normally the preferred technique for assembling the three-element strips into an array of cells, some circumstances may make it preferable to initially cut the three-element strips to length and then overlap them in staggered, parallel alignment for joining them together. One such circumstance is where the material chosen for the relatively opaque vanes is not suitable for the repeated longitudinal bending experienced as the strip traverses the various rolls in the disclosed helical winding operation. In that event, a cutting and assembling technique such as disclosed in the previously mentioned U.S. Pat. No. 5,888,639 may be preferred.

Another advantage of the constructions disclosed herein is that they all lend themselves to simple lap joints, parallel to the plane of the facing panels, at the points of attachment of successive strips to each other. When so joined, the smooth, generally planar character of the facing panels is more likely to be maintained at the joints. Lap joints so constructed and positioned are to be contrasted with the inwardly turned tabs, perpendicular to the facing panels, such as disclosed in FIGS. 11 and 11a of U.S. Pat. No. 5,888,639, which is more typical of honeycomb type cellular constructions as shown in FIG. 1 of that patent. The latter construction requires an additional folding step for assembly, and, unless there are post-assembly creases set at the face joints, it will not lie flat. Furthermore, if it is creased to make the faces lie flat, the vanes will not lie closed naturally or fully (as desired) and will not make the desired curving shapes when open.

Another advantage of the half-lap three-element strip, as exemplified by FIGS. 24 and 26 hereof, is that when the strip is spooled into roll 40 after welding, the double-thick portion is wide and stable enough to make a smooth, uniform roll with no distortion of the material. Subsequently, during the winding and gluing steps, this type of strip has improved directional stability and flatness, resulting in a smoother and more uniform product.

Figure 43:
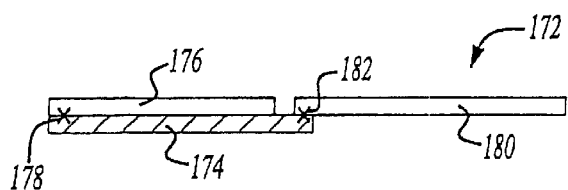
FIG. 43 is an end view, with the vertical scale exaggerated, of a modified three-element strip configuration of the present invention.

FIG. 43 illustrates a still further three-element strip configuration 172 wherein both front and rear sheer strips are bonded to the same face of the opacified strip. The term bonded includes any suitable technique for joining the strip elements together including, but not limited to, gluing, welding and/or sewing. Front sheer strip 176 is bonded at 178 to opacified strip 174, while rear sheer strip 180 is bonded at 182 to the opposite end of opacified strip 174.

Figure 44:
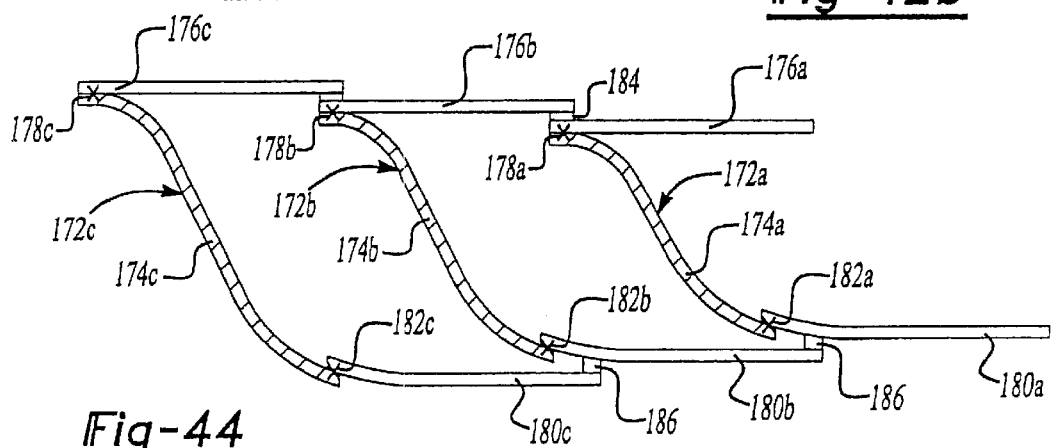
FIG. 44 is an enlarged fragmentary side view of the blind which results from use of the three-element strips of FIG. 43.

In positioning and gluing successive three-element strips in partially overlapping position, according to the method described with respect to other embodiments hereof (see FIG. 44), front glue line 184 is preferably placed directly over front bond line 178, to minimize any possible glue bleed-through problems. Rear glue line 186 is preferably offset from rear bond line 182, thereby creating a short internal sheer tab between rear bond line 182 and rear glue line 186. By way of example, front sheer strip 176 may be approximately one and three-quarters inches in width, rear sheer strip 180 approximately one and seven-eighths inches in width, and opacified strip 174 approximately two and one-eighth inches in width. With those dimensions, the width of the internal sheer tab between rear bond line 182 and rear glue line 186 may be about one thirty-second to one sixteenth of an inch. The resulting sheer tabs are contiguous parts of the sheer composite sheet (180a+180b+180c, etc . . . ) that results from the bonding together at rear glue line 186 of adjacent rear sheer strips 180. Any minor glue bleed-through at this rear location creates no problems because the sheer fabric layer in this region are backed only by a steel roll during the fabrication process.

Still further alternatives (not illustrated) for use of a three-element strip similar to the FIG. 43 embodiment could utilize glue line placement to create sheer tabs on the front side of the blind and/or to eliminate the sheer tabs on the rear side.

This invention may be further developed within the scope of the following claims. Accordingly, the above specification is to be interpreted as illustrative of only a few operative embodiments of the invention, and not in a strictly limiting sense. In the following claims, the words "right", "left", "upper" and "lower" have been used as relative orthogonal directions for ease of description only, and are not intended to be defined in relation to any external datum, such as the surface of the Earth. Also, "edge" or "edges", as used in the claims, means the extreme lateral edges of the strips or strip portion faces, along with a relatively narrow immediately adjacent portion of such faces.

We claim:

1. For use in a fabric Venetian blind of the type having front and rear panels formed of sheer fabric and joined by a series of spaced, parallel, light-controlling vanes formed of relatively opaque material, and wherein each adjacent pair of vanes and the portions of the front and rear panels between such vane pair define a longitudinally extending cell-like structure, the height of such cell being defined by the distance between two adjacent vanes when the blind is in its maximum light-transmitting condition, the improved two-element fabric strip which comprises:

first and second light-transmitting strip portions oriented in a generally parallel array and having an extended length dimension which is greater than their respective transverse width dimensions;

the transverse widths of said first and second light-transmitting strip portions partially overlapping each other by a distance which approximates the height of the cell, with the non-overlapped portions of each of said strip portions also having transverse widths which approximate the height of the cell, said strip portions being joined to each other along longitudinally extending lines adjacent their respective overlapping longitudinal edges, and the opposed overlapping portions of said strip portions between said lines of joinder defining an unjoined zone which is adapted to become a longitudinally extending pocket suitable for receiving a relatively opaque vane insert;

whereby when a fabric Venetian blind is formed of said two-element fabric strips, one of said front and rear panels will be comprised of said non-overlapping portion of said first light-transmitting strip portions, and the other of said front and rear panels will be comprised of said non-overlapping portion of said second light-transmitting strip portions, and said light-controlling vanes will be comprised of said vane insert-containing pocket.

\* \* \* \* \*

UNITED STATES PATENT AND TRADEMARK OFFICE
CERTIFICATE OF CORRECTION

PATENT NO.     : 6,634,409 B2
DATED          : October 21, 2003
INVENTOR(S)    : John A. Corey It is certified that error appears in the above-identified patent and that said Letters Patent is hereby corrected as shown below:

<u>Title page,</u>
Item [75], Inventors, please delete "Thomas J. Marusak" from the inventor's list.

Signed and Sealed this

Second Day of March, 2004

JON W. DUDAS
*Acting Director of the United States Patent and Trademark Office*